(12) United States Patent
Malka et al.

(10) Patent No.: US 11,138,690 B1
(45) Date of Patent: Oct. 5, 2021

(54) MULTI-IMAGE BRICK MOSAIC AND SYSTEMS AND METHODS FOR PRODUCTION THEREOF

(71) Applicant: Photobrick Pty. Ltd., Melbourne (AU)

(72) Inventors: Amir Malka, Haifa (IL); Eyal Israel, Melbourne (AU)

(73) Assignee: Photobrick Pty. Ltd., Melbourne (AU)

( * ) Notice: Subject to any disclaimer, the term of this patent is extended or adjusted under 35 U.S.C. 154(b) by 0 days.

(21) Appl. No.: 17/114,530

(22) Filed: Dec. 8, 2020

(51) Int. Cl.
*G06T 3/40* (2006.01)
*G06T 11/00* (2006.01)
*G06T 7/90* (2017.01)

(52) U.S. Cl.
CPC .............. *G06T 3/4038* (2013.01); *G06T 7/90* (2017.01); *G06T 11/001* (2013.01); *G06T 2207/10024* (2013.01); *G06T 2207/20221* (2013.01)

(58) Field of Classification Search
CPC ....... G06T 3/4038; G06T 7/90; G06T 11/001; G06T 2207/10024; G06T 2207/20221
See application file for complete search history.

(56) References Cited

U.S. PATENT DOCUMENTS 10,213,692 B2 * 2/2019 Velic ..................... A63F 13/213

2003/0132966 A1 * 7/2003 Simas ..................... G06T 17/10
715/764
2011/0298922 A1 * 12/2011 Horovitz ................. G06T 11/60
348/143

OTHER PUBLICATIONS

"Lego Art Remix" Deb Banerji. https://lego-art-remix.debkbanerji.com/. First seen Nov. 3, 2020 (http://web.archive.org/web/20201103143734/https://lego-art-remix.debkbanerji.com/). Accessed via the internet Jul. 9, 2021. (Year: 2020).*
Gerstner et al. "Pixelated Image Abstraction", Proceedings of the International Symposium on Non-Photorealistic Animation and Rendering, NPAR 2012, p. 29-36, Jun. 4, 2012.

* cited by examiner

Primary Examiner — Antonio A Caschera

(57) ABSTRACT

A multi-image brick mosaic depicting a plurality of images each from a different viewing angle and systems and methods for building it. The multi-image brick mosaic includes a plurality of interlocking bricks assembled on baseplate(s) where the interlocking bricks are divided to multiple brick sets each associated with a respective one of multiple images. The top facet of the interlocking bricks of each group are aligned to a respective one of multiple angles. Instructions are computed for selecting the color of the top facet of each interlocking brick based on color analysis of a respective pixel group of a respective image mapped by the respective interlocking brick. Further instructions are computed for assembly of the interlocking bricks on the baseplates(s) to form the multi-image brick mosaic depicting multiple pixelated versions of the images, each pixelated image is clearly viewable from a respective one of the angles.

11 Claims, 19 Drawing Sheets

FRONT VIEW

▨ 304A    ▧ 304B    ▦ 304C

BOTTOM VIEW

▨ 304A    ▧ 304B    ▦ 304C
╱ ANGLE 1    ╲ ANGLE 2    ⋀ ANGLE 3

ANGLE 1 VIEW    ANGLE 3 VIEW    ANGLE 2 VIEW 300B    300B    300B

NUMBER OF BRICKS PER COLOR FOR ASSEMBLY

| # | 1 | 2 | 3 | 4 | 5 | 6 | 7 | 8 | 9 | 10 |
|---|---|---|---|---|---|---|---|---|---|---|
| Count | 702 | 439 | 206 | 41 | 118 | 42 | 87 | 66 | 415 | 489 |

| # | 11 | 12 | 13 | 14 | 15 | 16 | 17 | 18 | 19 | 20 |
|---|---|---|---|---|---|---|---|---|---|---|
| Count | 43 | 214 | 393 | 128 | 195 | 213 | 383 | 265 | 174 | 583 |

| # | 21 | 22 | 23 |
|---|---|---|---|
| Count | 208 | 490 | 250 |

COLOR CODES

- 1 = Black
- 2 = Skin Color
- 3 = Bronze
- 4 = Neon Blue
- 5 = Light Blue
- 6 = Dark Pink
- 7 = Lavender Purple
- 8 = Magenta
- 9 = Yellow
- 10 = Dark Brown
- 11 = Blue
- 12 = Brown
- 13 = Dark Skin Color
- 14 = Navy Blue
- 15 = Light Skin Color
- 16 = Red
- 17 = Light Brown
- 18 = Reddish Brown
- 19 = Dark Grey
- 20 = Peach Skin Color
- 21 = Light Grey
- 22 = White
- 23 = Mouse Grey

FIG. 5B

BRICK ASSEMBLY INSTRUCTIONS FOR BASEPLATE (1,1)

NUMBER OF BRICK PER COLOR FOR ASSEMBLY ON BASEPLATE (1,1)

BRICK ASSEMBLY INSTRUCTIONS FOR BASEPLATE (2,1)

NUMBER OF BRICK PER COLOR FOR ASSEMBLY ON BASEPLATE (2,1)

BRICK ASSEMBLY INSTRUCTIONS FOR BASEPLATE (2,2)

NUMBER OF BRICK PER COLOR FOR ASSEMBLY ON BASEPLATE (2,2)

BRICK ASSEMBLY INSTRUCTIONS FOR BASEPLATE (1,3)

NUMBER OF BRICK PER COLOR FOR ASSEMBLY ON BASEPLATE (1,3)

BRICK ASSEMBLY INSTRUCTIONS FOR BASEPLATE (2,3)

NUMBER OF BRICK PER COLOR FOR ASSEMBLY ON BASEPLATE (2,3)

MULTI-IMAGE BRICK MOSAIC AND SYSTEMS AND METHODS FOR PRODUCTION THEREOF

FIELD AND BACKGROUND OF THE INVENTION

The present invention, in some embodiments thereof, relates to producing brick mosaics and, more specifically, but not exclusively, to designing, kitting and building multi-image brick mosaics configured to depict a plurality of images each form a respective one of the plurality of viewing angles.

House décor has always been a major trend in modern societies and the search for new, innovative and original ornamentations is therefore constantly fueled.

One of the most popular decorations sought by people is paintings, pictures and/or other visual objects which may be hanged and/or otherwise placed in a residential and/or office space (rooms, halls, corridors, etc.).

As part of this trend, three dimensions (3D) images, paintings, logos and/or the like are also becoming more popular.

SUMMARY OF THE INVENTION

According to a first aspect of the present invention there is provided a method of computing instructions for building a multi-image brick mosaic depicting a plurality of images each from a different viewing angle, comprising using one or more processors for:

Receiving a plurality of images each comprising a respective first number of pixels.

Converting each of the plurality of images to a respective one of a plurality of pixelated images comprising a predefined second number of pixels smaller than the first number.

Selecting a color of each of the second number of pixels of each pixilated image from a limited number of colors.

Computing kit instructions for preparing a kit comprising one or more baseplates and a plurality of brick sets each associated with a respective one of the plurality of images and comprising a plurality of interlocking bricks having a top facet aligned to a respective one of a plurality of angles. Each of the plurality of bricks of each brick set is mapped to a respective pixel of the second number of pixels of a respective pixilated image and is painted in the color selected for the respective pixel.

Computing assembly instructions for assembling each of the plurality of bricks of each of the plurality of brick sets on one of the one or more baseplate to build a multi-image brick mosaic depicting each pixelated image of each of the plurality of images when viewed from a respective angle.

Outputting the kit instructions and the assembly instructions for building the multi-image brick mosaic using the kit.

According to a second aspect of the present invention there is provided a system for computing instructions for building a multi-image brick mosaic depicting a plurality of images each from a different viewing angle, comprising a tangible storage medium storing a code and one or more processors coupled to the tangible storage medium. The one or more processors are configured to execute the code. The code comprising:

Code instructions to receive a plurality of images each comprising a respective first number of pixels.

Code instructions to convert each of the plurality of images to a respective one of a plurality of pixelated images comprising a predefined second number of pixels smaller than the first number.

Code instructions to select a color of each of the second number of pixels of each pixilated image from a limited number of colors.

Code instructions to compute kit instructions for preparing a kit comprising one or more baseplates and a plurality of brick sets each associated with a respective one of the plurality of images and comprising a plurality of interlocking bricks having a top facet aligned to a respective one of a plurality of angles. Each of the plurality of bricks of each brick set is mapped to a respective pixel of the second number of pixels of each pixilated image and is painted in the color selected for the respective pixel.

Code instructions to compute assembly instructions for assembling each of the plurality of bricks of each of the plurality of brick sets on one of the one or more baseplates to build the multi-image brick mosaic depicting each pixelated image of each of the plurality of images when viewed from a respective angle.

Code instructions to output the kit instructions and the assembly instructions for building the multi-image brick mosaic using the kit.

According to a third aspect of the present invention there is provided a computer program product comprising program instructions executable by a computer, which, when executed by the computer, cause the computer to perform a method according to the first aspect.

According to a fourth aspect of the present invention there is provided a multi-image brick mosaic depicting a plurality of images each from a different viewing angle, comprising:

A plurality of interlocking bricks divided to a plurality of brick sets each associated with a respective one of a plurality of images, each of the plurality of bricks of each of the plurality of brick sets maps a respective group of adjacent pixels of the respective image, a top facet of the respective brick is aligned to a respective one of a plurality of angles and is painted with a color selected from a limited number of colors based on a color analysis of the pixels of the respective group.

One or more baseplates comprising a plurality of bulges configured to enable affixing of the plurality of bricks of each of the plurality of brick sets;

Wherein the plurality of bricks of the plurality of brick sets are assembled on the one or more baseplates according to assembly instructions to form a multi-image brick mosaic depicting a pixelated version of each of the plurality of images when viewed from a respective one of the plurality of angles.

In a further implementation form of the first, second, third and/or fourth aspects, each of the second number of pixels of the respective pixelated image represents a respective group of adjacent pixels of the respective image.

In a further implementation form of the first, second, third and/or fourth aspects, the color of each of the second number of pixels of each pixilated image is selected from the limited number of colors based on a color analysis of the pixels of the respective group.

In an optional implementation form of the first, second, third and/or fourth aspects, one or more image manipulation operations are applied to one or more of the plurality of images. The image manipulation operations comprising one or more of zooming, panning, rotating, shifting and dithering.

In an optional implementation form of the first, second, third and/or fourth aspects, one or more color attributes of one or more of the second number of pixels of one or more of the plurality of pixelated images are adjusted. The color attributes comprising one or more of brightness, contrast, saturation and High Dynamic Range (HDR).

In an optional implementation form of the first, second, third and/or fourth aspects, the color of one or more of the second number of pixels of one or more of the plurality of pixelated images is adjusted.

In a further implementation form of the first, second, third and/or fourth aspects, the color of one or more of the second number of pixels of one or more of the pixelated images is adjusted to alter at least partially a background of the one or more pixelated image.

In a further implementation form of the first, second, third and/or fourth aspects, the color of one or more of the second number of pixels of one or more of the pixelated image is adjusted to include one or more symbols in the respective pixelated image.

In an optional implementation form of the first, second and/or third aspects, a simulated preview of the multi-image brick mosaic is generated based on the kit instructions and the assembly instructions.

In an optional implementation form of the first, second and/or third aspects, a viewing angle of the simulated multi-image brick mosaic is changed in the preview.

In an optional implementation form of the first, second and/or third aspects, the preview is animated to display the simulated multi-image brick mosaic over one or more predefined backgrounds.

In a further implementation form of the first, second, third and/or fourth aspects, each of the plurality of bricks is configured to have an angled top facet aligned to a respective one of the plurality of angles and the surface of the one or more baseplates is straight.

In a further implementation form of the first, second, third and/or fourth aspects, each of the plurality of bricks is configured to have a straight top facet and the surface of the one or more baseplates is configured to align to a respective one of the plurality of angles.

In a further implementation form of the first, second, third and/or fourth aspects, each of the plurality of bricks is configured to have an angled top facet aligned to a first partial angle of a respective one of the plurality of angles and the surface of the one or more baseplates is configured to align to a second partial angle of the respective angle such that a sum of the first partial angle and the second partial angle equals the respective angle.

In a further implementation form of the first, second, third and/or fourth aspects, the multi-image brick is constructed of two brick sets each comprising a plurality of bricks having a top facet aligned to a respective one of two angles such that the multi-image brick depicts a pixelated version of each of two images when viewed from a respective one of the two angles.

In a further implementation form of the first, second, third and/or fourth aspects, the multi-image brick is constructed of three brick sets each comprising a plurality of bricks having a top facet aligned to a respective one of three angles such that the multi-image brick depicts a pixelated version of each of three images when viewed from a respective one of the three angles.

In a further implementation form of the first, second, third and/or fourth aspects, the multi-image brick is constructed of four brick sets each comprising a plurality of bricks having a top facet aligned to a respective one of four angles such that the multi-image brick depicts a pixelated version of each of three images when viewed from a respective one of the four angles.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

In the drawings:

FIG. 5A, FIG. 5B, FIG. 5C, FIG. 5D, FIG. 5E, FIG. 5F, FIG. 5G and FIG. 5H are exemplary kit instructions computed for creating a kit of for an exemplary multi-image brick mosaic and assembly instructions for building the exemplary multi-image brick mosaic using the kit, according to some embodiments of the present invention;

DESCRIPTION OF SPECIFIC EMBODIMENTS OF THE INVENTION

Figure 1:
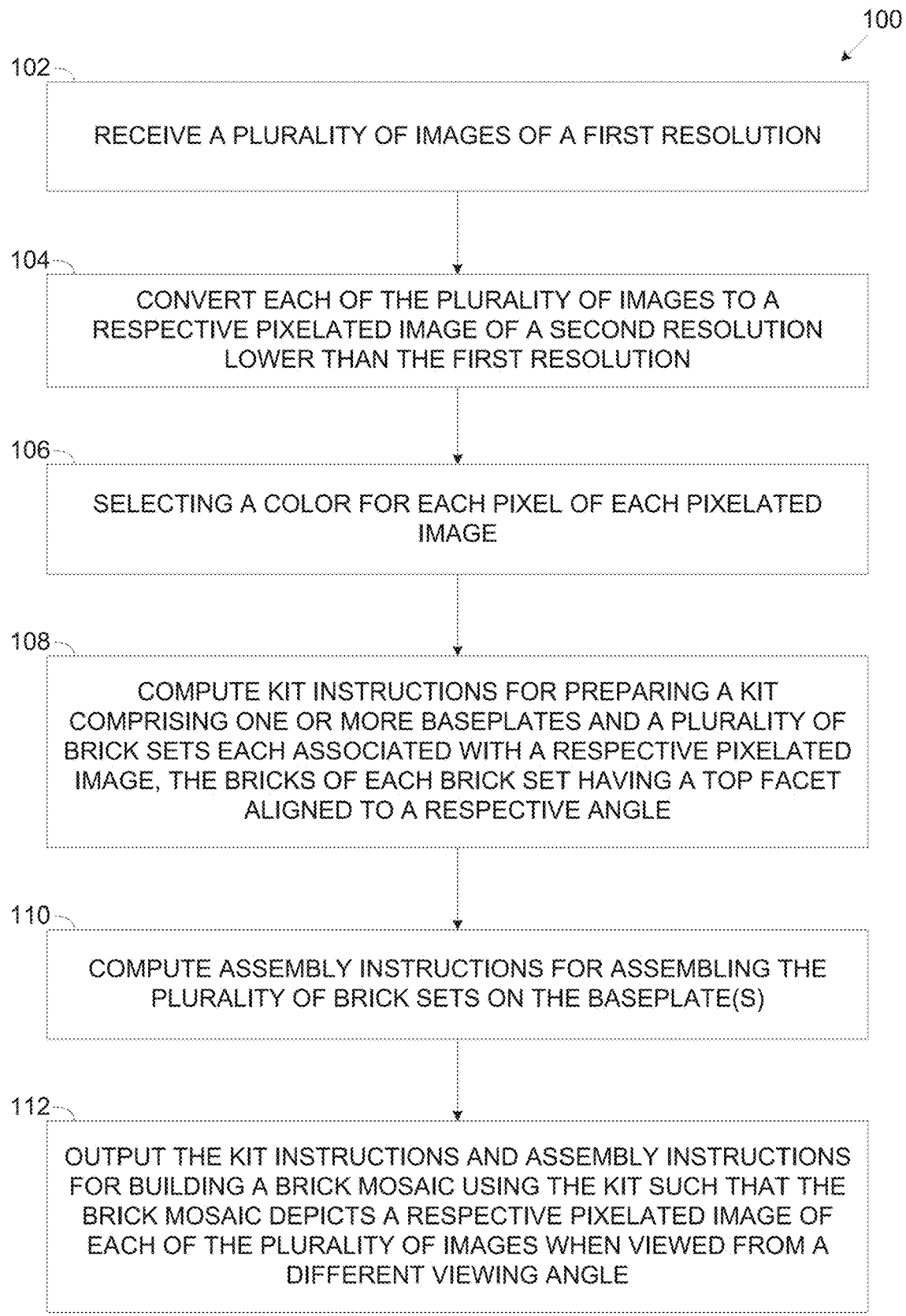
FIG. 1 is a flowchart of an exemplary process of creating a kit comprising a plurality of brick sets each associated with one of a plurality of images for building a multi-image brick mosaic depicting each of the images from a different view angle, according to some embodiments of the present invention.

The present invention, in some embodiments thereof, relates to producing brick mosaics and, more specifically, but not exclusively, to designing, kitting and building multi-image brick mosaics configured to depict a plurality of images each form a respective one of the plurality of viewing angles.

According to some embodiments of the present invention, there are provided methods, systems and computer program products for designing, kitting and building multi-image brick mosaics configured to depict a plurality of images each from a respective one of the plurality of viewing angles.

The multi-image brick mosaic is constructed from a plurality of interlocking bricks assembled on one or more baseplates comprising a plurality of bulges configured to enable affixing of the interlocking bricks in a firm interlocked manner while supporting easy assembly and disassembly of the bricks. In particular, the multi-image brick mosaic is constructed from a plurality of brick sets each comprising a plurality of bricks associated with a respective one of the plurality of images. When assembled accordingly, the plurality of bricks of each brick set, specifically the top facet (face) of the plurality of bricks of each brick set form the respective image associated with the respective brick set.

However, the top facet of all the bricks of each brick is aligned to a respective one of a plurality of angle such that the top facet of all the bricks of each brick set are aligned to a different angle, for example, 30°, 45°, 60°, 120°, 135°, 150° and/or the like. As such, after assembled accordingly, a spectator, human and/or imaging device (camera, imaging sensor, etc.) viewing the multi-image brick mosaic from one of the plurality of (viewing) angles, the spectator may see a respective one of the plurality of images. In other words, when viewing the multi-image brick mosaic from each of the plurality of angles the top facets of the bricks of the brick set which are aligned to that angle are perpendicular, or at least substantially perpendicular to the line of sight between the spectator and the multi-image brick mosaic and thus form a plane depicting the image associated with the respective brick set. The top facets of the bricks of the other brick set(s) which are aligned to different angle(s) are in acute angle(s) to the line of sight of the spectator and are thus not visible or at least very partially and insignificantly visible to the spectator.

One or more techniques and/or constructions may be applied to align the top facet of each of the bricks with the respective angle. For example, the each of the bricks may be configured to have an angled top facet aligned according to the respective angle. In another example, the baseplate(s) may be configured to have a plurality of angled surfaces aligned according to the plurality of angels such that when straight facet bricks are assemble on the angled surfaces, the top facet of each of the assembled bricks is aligned to a respective one of the angles. In another example, the angled facet of each of the plurality of bricks may be implemented by a combination of an angled surface in the baseplate(s) and an angled top facet of the bricks.

In order to properly construct and assemble the multi-image brick mosaic, accurate kit instructions and assembly instructions are computed, whereas the kit instructions may be used for preparing (creating) a kit comprising the components required for building the multi-image brick mosaic and the assembly instructions may be used for assembling the multi-image brick mosaic using the kit.

A user may select a plurality of images to be depicted by the multi-image brick mosaic and may further define a desired size of the multi-image brick mosaic. The selected images may typically be high resolution images having a first number of pixels which may be typically significantly large. Since the multi-image brick mosaic is constructed of a limited number of bricks, the images depicted by the multi-image brick mosaic may be pixelated versions of the images selected by the user.

The images are therefore converted to respective pixelated images each comprising a second number of pixels which is lower than the first number of pixels. The second number of pixels may be defined and/or selected according to the size of the multi-image brick mosaic, according to the size of the bricks which may define the density of the bricks assembled on the baseplate(s) to form the multi-image brick mosaic and/or the like.

The image conversion may be done using one or more methods, techniques and/or algorithms as known in the art, specifically by mapping each pixel of each pixelated image to a group of pixelated pixels in the respective image. The color of each pixel in the pixelated image may be then selected, computed and/or derived based on a color analysis of the colors of the pixels in the respective group mapped by the respective pixelated image pixel. For example, the color of each pixelated image pixel may be selected and/or computed by aggregating the colors of the pixels in the respective group, for example, averaging, blending and/or the like. In particular, the color of each of the pixels of the pixelated images may be selected from a limited number of colors, for example, 16, 24, 32, 48, 64 and/or the like.

Each brick of each brick set may be then mapped to a respective one of the pixels in the respective pixelated image created from the image associated with the respective brick set. In particular, the color of the respective brick or at least the color of the top facet of the respective brick may be selected to be the color of the respective pixelated image pixel mapped by the respective brick.

Based on the multi-image brick mosaic design and the color mapping, the kit instructions may be computed for preparing the kit for the multi-image brick mosaic. The kit instructions may include, for example, the number of baseplates required for assembling the multi-image brick mosaic, an arrangement (layout) of the baseplates, the overall number of bricks of each brick set, the number of bricks of each brick set per color, a color index and/or the like.

Additionally, based on the multi-image brick mosaic design and the color mapping, the assembly instructions may be computed for building the multi-image brick mosaic using the kit, i.e., for assembling the bricks on the baseplate(s) to form the multi-image brick mosaic depicting the plurality of images, or more accurately the pixelated images (versions) of the images selected by the user where each of the pixelated images is viewable form a respective one of the plurality of (viewing) angles. The assembly instructions may include, for example, a map of the each of the baseplates with the mapping of the bricks identified by colors and/or color codes.

According to some embodiment of the present invention, one or more multi-image brick mosaics may be constructed of a plurality of interlocking bricks, in particular self-interlocking bricks capable of attaching to adjacent interlocking bricks without using any baseplate. Each of the plurality of self-interlocking bricks may include one or more One or more of the baseplates 302 may further include one or more mechanical provisions, for example, a bulge, a protrusion, a clipping element, an interlocking element and/or the like to enable affixing of each of the interlocking bricks to one or more adjacent self-interlocking bricks in order to form the multi-image brick mosaic. As the self-interlocking bricks are affixed to each other, specifically to adjacent self-interlocking bricks there is no need for any structural baseplate.

Using the kit instructions, the kit may be accurately and effectively prepared (created) and delivered to a user who may easily and efficiently use the kit to build the multi-image brick mosaic according to the assembly instructions.

The multi-image brick mosaic may present major advantages and benefits compared to existing brick mosaic and the methods for producing them. First, most if not all existing brick mosaics are limited to depict a single image which may be best visible from a front view of the brick mosaic. The multi-image brick mosaic, on the other hand may depict a plurality of different images.

Moreover, as the existing brick mosaics are limited to depict a single image, the single image may not be clearly visible and/or discernable from viewing angles other than the front view. In particular, as a spectator moves further away from a center view (90° angle) of the brick mosaic, the more invisible the image may become since the top facets of the bricks are in acute angle with respect to the line of sight of the spectator. In contrast, since the multi-image brick mosaic depicts a plurality of images each from a different viewing angles, there are in fact a plurality of angles in which the spectator's line of sight is substantially perpendicular to a plane formed by the top facets of the bricks of one of the brick sets which are aligned to a certain angle substantially equal to the viewing angle and thus one of the images may be visible from most if not all viewing angles.

Furthermore, constructing the multi-image brick mosaic from the self-interlocking bricks may allow creating multi-image brick having highly flexible shapes, border lines and/or contour lines since the multi-image brick mosaic is not constrained to the shape of the baseplate(s) typically used to construct the multi-image brick mosaic. In fact, the shape and border lines of the multi-image brick mosaic constructed from the self-interlocking bricks may be defined by the size of the self-interlocking bricks which may be very small allowing for a high resolution and high granularity in shaping the multi-image brick mosaic, specifically its border lines.

In addition, computing the kit instructions according to the exact design of the multi-image brick mosaic may significantly increase efficiency and/or accuracy of the kit preparation resulting in a kit that is accurately custom per each user design. The kit instructions may further enable automated kitting which may significantly reduce labor time, costs and/or other resources (space costs, shipping costs, etc.). Additionally, computing the assembly instructions according to the exact design of the multi-image brick mosaic may significantly reduce labor time for assembling and building the multi-image brick mosaic which may significantly increase the user experience of the user.

According to some embodiments of the present invention there are provided methods, systems and computer program products for presenting a Graphical User Interface (GUI) to the user for designing, configuring, and/or adjusting the multi-image brick mosaic. For example, using the GUI, the user may apply one or more manipulations and/or transformations to one or more of the selected images and/or their respective pixelated images. The manipulations and/or transformations may include, for example, zooming, panning, rotating, shifting and/or the like. In another example, using the GUI, the user may change, adjust and/or manipulate one or more attributes of one or more of the pixels in one or more pixelated images, for example, brightness, contrast, (color) saturation, High Dynamic Range (HDR) and/or the like. The user may apply the pixel adjustments for one or more effects, for example, altering and/or modifying the color of one or more objects or part thereof in the pixelated image, adjusting a background, inserting text, inserting one or more symbols and/or the like.

The GUI may further provide a simulation preview of the designed multi-image brick mosaic to present the user with a simulated multi-image brick mosaic, optionally in an animated environment.

The GUI may present major advantages and benefits. First, providing the user the ability to adjust, manipulate and/or alter any of a vast range of manipulations, transformations and/or attributes of the images, the multi-image brick mosaic layout (shape, arrangement, size, etc.) and/or the like may allow the user to customize the multi-image brick mosaic according to his specific needs, likes, desires and/or the like.

Moreover, simulating the designed multi-image brick mosaic as it would look in real life may significantly improve a user experience of the user who may be able get an accurate impression of how the multi-image brick mosaic will look like hanging in a real world location (e.g. room, office, etc.). This may significantly increase user content and satisfaction with the designed multi-image brick mosaic and the final outcome of hanging the multi-image brick mosaic in a room, office and/or the like.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 illustrates a flowchart of an exemplary process of creating a kit comprising a plurality of brick sets each associated with one of a plurality of images for building a multi-image brick mosaic depicting each of the images from a different view angle, according to some embodiments of the present invention.

An exemplary process 100 may be executed to automatically compute instructions for assembling and building a multi-image brick mosaic which is constructed of a plurality of interlocking bricks selected and configured to depict a respective one of a plurality of images when viewed from a respective one of a plurality of viewing angles.

The instructions computed in the process 100 may include both kit instructions for preparing a kit comprising interlocking bricks and one or more baseplates of the multi-image brick mosaic and assembly instructions for assembling the bricks on the baseplate(s) to build the multi-image brick mosaic.

Figure 2:
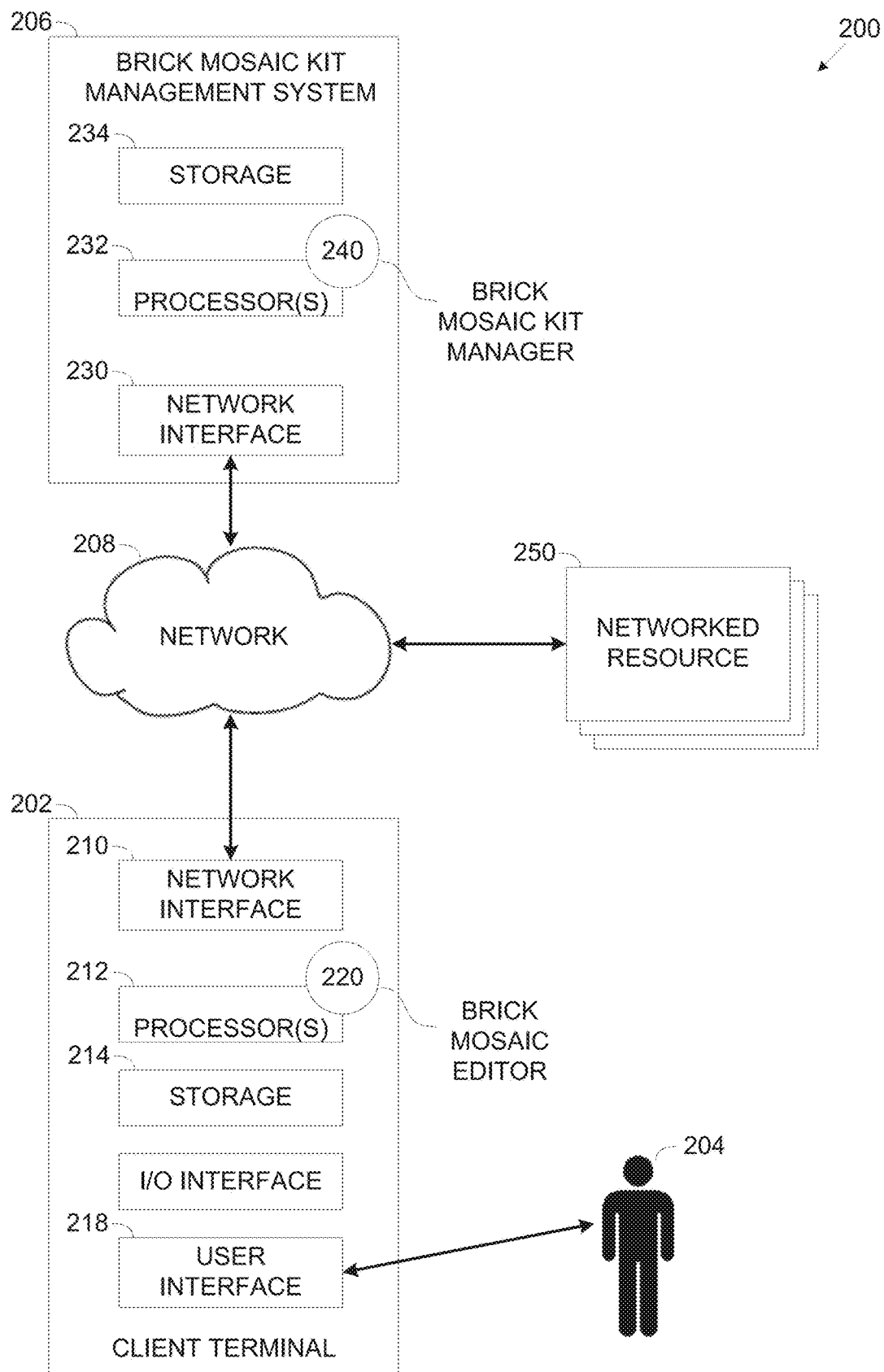
FIG. 2 is a schematic illustration of an exemplary system for creating a kit comprising a plurality of brick sets each associated with one of a plurality of images for building a multi-image brick mosaic depicting each of the images from a different view angle, according to some embodiments of the present invention.

Reference is also made to FIG. 2, which is a schematic illustration of an exemplary system for creating a kit comprising a plurality of brick sets each associated with one of a plurality of images for building a multi-image brick mosaic depicting each of the images from a different view angle, according to some embodiments of the present invention.

The process 100 may be executed in an exemplary system 200 comprising one or more client devices 202, for example, a Smartphone, a tablet, a computer and/or the like associated and used by one or more users 204 and a brick mosaic kit management system 206.

The client device 202 may include a network interface 210 for connecting to a network 208, a processor(s) 212 for designing one or more multi-image brick mosaics, a storage 212 for storing program (code) and/or data, and a user interface 218 for interacting with the associated user 204.

The network interface 210 may include one or more wired and/or wireless network interfaces to enable the client device 202 to connect to the network 208 comprising one or more wired and/or wireless networks, for example, a Local Area Network (LAN), a Wireless LAN (WLAN) (e.g. Wi-Fi), a Wide Area Network (WAN), a Municipal Area Network (MAN), a cellular network, the internet and/or the like.

Via the network interface 210, the client device 202 may therefore communicate with one or more remote network resources 250, for example, a server, a storage server, a cloud service and/or the like. For example, the client device 202 may communicate with one or more networked services, platforms and/or applications storing one or more images, for example, a photograph, an art image (i.e. picture, painting, etc.) and/or the like.

The processor(s) 212, homogenous or heterogeneous, may include one or more processing nodes arranged for parallel processing, as clusters and/or as one or more multi core processor(s). The storage 214 may include one or more non-transitory memory devices, either persistent non-volatile devices, for example, a ROM, a Flash array, a hard drive, an SSD, a magnetic disk and/or the like and/or one or more volatile devices, for example, a RAM device, a cache memory and/or the like.

The processor(s) 212 may execute one or more software modules, for example, a process, a script, an application, an agent, a utility, a tool, an Operating System (OS), a service, a plug-in, an add-on and/or the like each comprising a plurality of program instructions stored in a non-transitory medium (program store) such as the storage 214 and executed by one or more processors such as the processor(s) 212. For example, the processor(s) 212 may execute a brick mosaic editor 220 for designing one or more brick mosaics, specifically multi-image brick mosaics. Optionally, the brick mosaic editor 220 may utilize one or more hardware elements available in the client device 202, for example, a circuit, a component, an Integrated Circuit (IC), an Application Specific Integrated Circuit (ASIC), a Field Programmable Gate Array (FPGA), a Digital Signals Processor (DSP), a Graphic Processing Unit (GPU) and/or the like.

The brick mosaic editor 220 may further include and/or utilize a Graphical User Interface (GUI) to present the user 204 with a user friendly, efficient and comprehensive tool set to enable the user 204 to design the multi-image brick mosaic(s) according to his preferences.

The user interface 218 may include one or more Human-Machine Interfaces (HMI) interfaces for interacting with the user 204, for example, a keyboard, a touchpad, a pointing device, a touchscreen, a screen, a digital pen, a speaker, an earphone, a microphone and/or the like.

The brick mosaic kit management system 206, for example, a server, a computing node, a cluster of computing nodes and/or the like may include a network interface 230 such as the network interface 210 for connecting to the network 208, a processor(s) 232 such as the processor(s) 212 for managing preparation of one or more kits which may be used for building respective brick mosaics, specifically multi-image brick mosaics, and a storage 234 such as the storage 214.

The storage 234 may further include one or more network storage resources, for example, a storage server, a Network Attached Storage (NAS), a network drive, a cloud storage service and/or the like accessible via the network interface 230.

As described for the processor(s) 212, the processor(s) 232 may execute one or more software modules, for example, a brick mosaic kit manager 240 for managing the preparation of one or more kits which may be used for building respective multi-image brick mosaic. Again, as described for the brick mosaic editor 220, the brick mosaic kit manager 240 may utilize one or more hardware elements available in the brick mosaic kit management system 206, for example, a circuit, a component, an IC, an ASIC, an FPGA, a DSP, a GPU and/or the like.

Optionally, the brick mosaic kit management system 206, specifically the brick mosaic kit manager 240 are utilized by one or more cloud computing services, platforms and/or infrastructures such as, for example, Infrastructure as a Service (IaaS), Platform as a Service (PaaS), Software as a Service (SaaS) and/or the like provided by one or more vendors, for example, Google Cloud, Microsoft Azure, Amazon Web Service (AWS) and Elastic Compute Cloud (EC2) and/or the like.

The brick mosaic editor 220 may be implemented according to one or more architectures as known in the art. For example, the brick mosaic editor 220 may be a stand-alone application executed by the client device 202. In another example, the brick mosaic editor 220 may be implemented as web application serviced from a remote networked resource such as, for example, the brick mosaic kit management system 206 and/or one or more of the networked resources 250 such that the brick mosaic editor 220 executed by the client device 202 may be a local agent and/or a web browser executed to communicate with the remote networked resource and display the GUI to the user 204.

Accordingly, the process 100 may be executed entirely by the client device 202, entirely by the mosaic kit management system 206 or by a combination of the client device 202 and the mosaic kit management system 206. For example, the process 100 may be executed by the brick mosaic editor 220, by the brick mosaic kit manager 240 and/or by any combination of the two software modules.

Embodiments and variants of the execution according to different software deployments and architectures are presented herein after in more detail. However, other implementations and/or deployments may become apparent to a person skilled in the art and the presented embodiments should not be construed as limiting.

Each multi-image brick mosaic is constructed of one or more baseplates on which a plurality of interlocking bricks are assembled to depict a plurality of images, specifically to depict a respective one of the plurality of images in a respective one of a plurality of viewing angles. This means that when a spectator (human and/or viewing device) views the multi-image brick mosaic from one of the plurality of viewing angles, the spectator may see a respective one of the plurality of images.

This is accomplished by dividing the plurality of bricks to a plurality of brick sets each associated with a respective one of the plurality of images. The bricks in each of the brick sets are configured to have a top facet (face) aligned to a respective one of the plurality of angles, for example, 30°, 45°, 60°, 120°, 135°, 150° and/or the like. As such, when viewed by the spectator from a certain one of the (viewing) angles, the top facet of the bricks of the respective brick set are aligned in a plane that is substantially perpendicular to the line of sight between spectator and the multi-image brick mosaic and therefore form the respective image associated with the respective brick set. However, the top facet of the bricks of the other brick sets which are aligned to different angle(s) are in acute angle(s) to the line of sight and are thus not visible or at least very partially and insignificantly visible to the spectator.

The plurality of images selected to be portrayed by the multi-image brick mosaic may be high resolution images having a large number of pixels which cannot be directly mapped by the limited number of bricks of the multi-image brick mosaic. The multi-image brick mosaic may therefore depict pixelated versions of the images where the pixelated versions are created by mapping each brick in the multi-image brick mosaic to a respective group of adjacent pixels in the image. Specifically, each brick of each brick set is configured to map a respective group of adjacent pixels in the respective image associated with the respective brick set.

Mapping each brick to the respective group of adjacent pixels may be done using one or more methods and/or techniques as known in the art, for example, selecting a color of the respective brick based on a color analysis of the respective group of pixels. Moreover, the color of each brick may be selected from a limited color palette, i.e., from a limited number of colors, for example, 16, 24, 32, 48, 64 and/or the like. For example, the color of one or more of the bricks may be selected to be an aggregated color (e.g. average, combination, etc.) of the colors of the respective group of pixels it maps.

One or more techniques and/or constructions may be applied to align the top facet of each of the bricks with the respective angle. For example, according to some embodiments of the present invention, each of the plurality of bricks may be configured to have an angled top facet aligned according to a respective angle one of the plurality of angles. In another example, the baseplate(s) may be configured to have a plurality of angled surfaces each aligned according to a respective one of the plurality of angels such that when straight facet bricks are assemble on the angled surfaces, the top facet of each of the assembled bricks is aligned to a respective one of the angles. Moreover, the angled top facet of the bricks may be implemented by a combination of partial angles of angled surfaces of the baseplate(s) and a partial angle of an angled top facet of the bricks. This means that each of the plurality of bricks may be configured to have an angled top facet aligned to a first partial angle of a respective one of the plurality of angles while the surface of the baseplate(s) may be configured to align to a second partial angle of the respective angle such that a sum of the first partial angle and the second partial angle equals the respective angle.

Figure 3A:
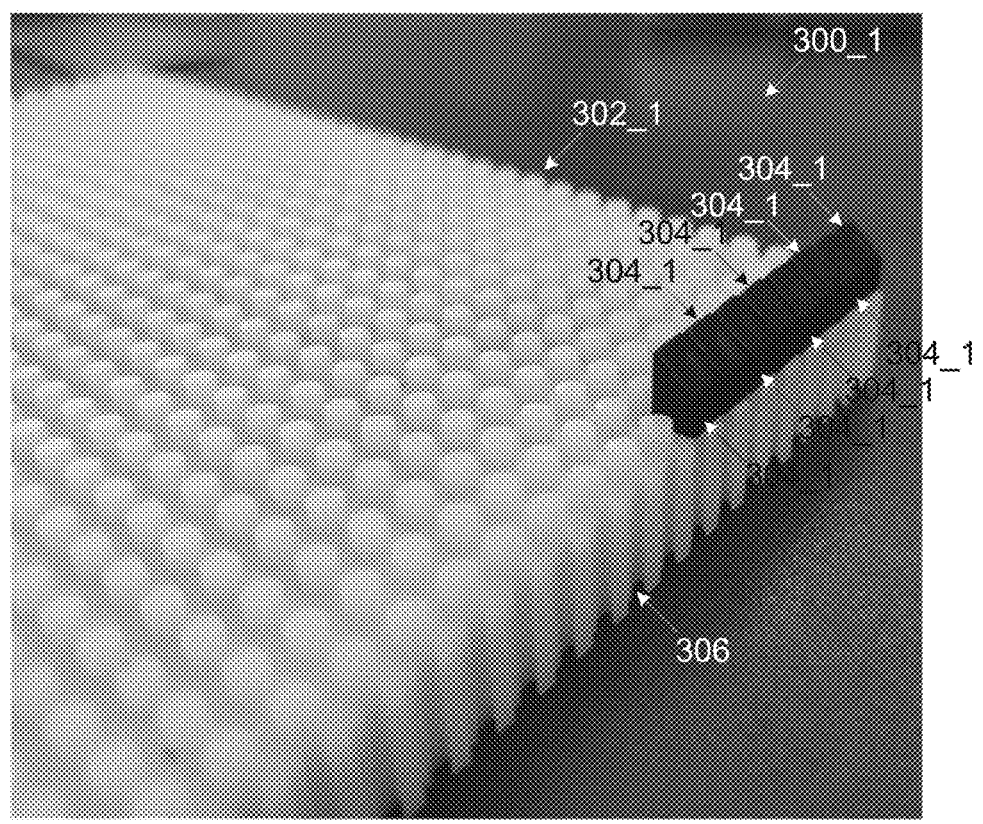
FIG. 3A, FIG. 3B and FIG. 3C are schematic illustrations of exemplary building blocks of multi-image brick mosaics depicting a plurality of images from different view angles, according to some embodiments of the present invention.
Figure 3A:
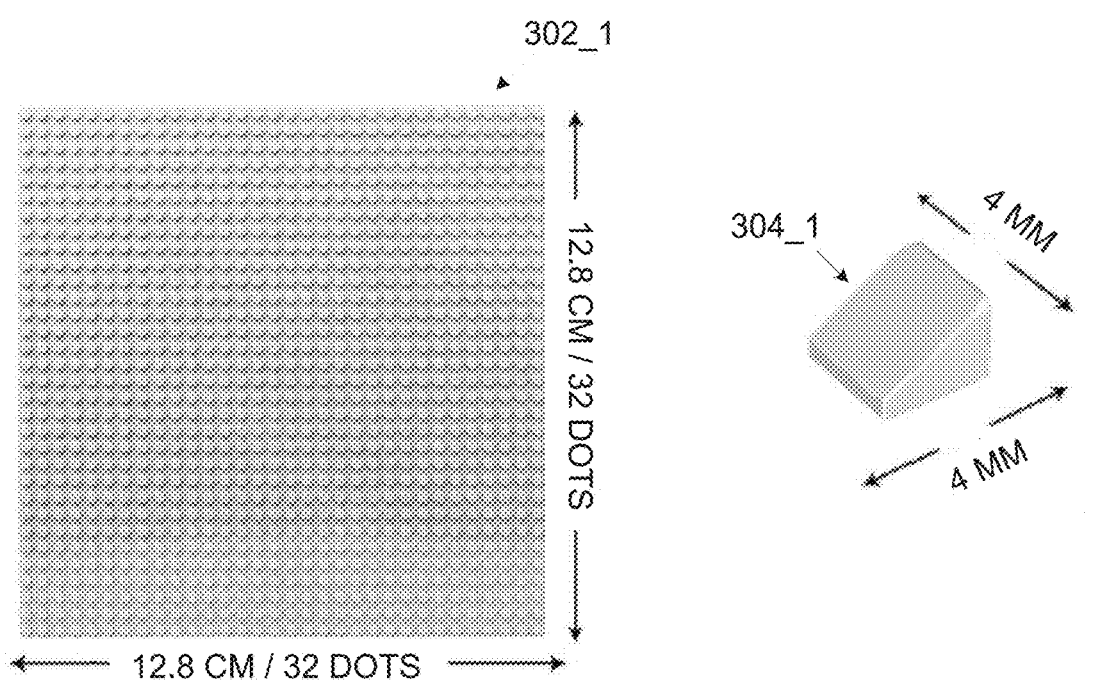
Figure 3B:
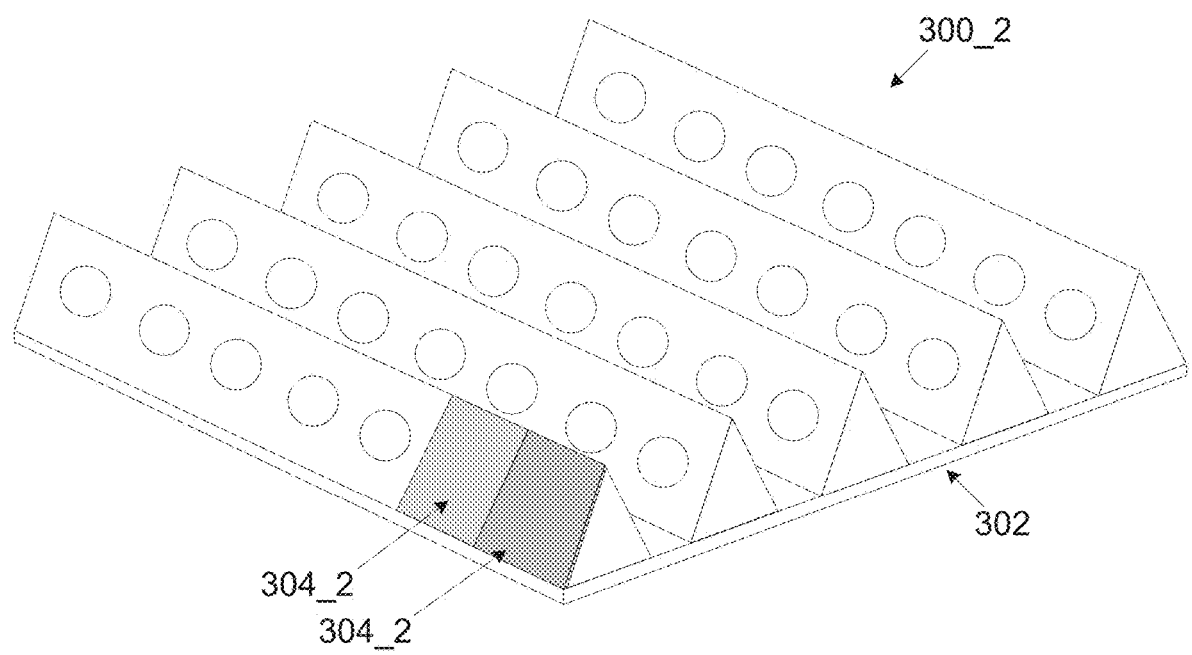
Figure 3B:
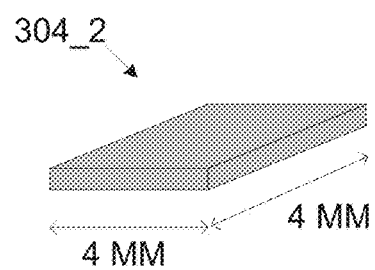
Figure 3C:
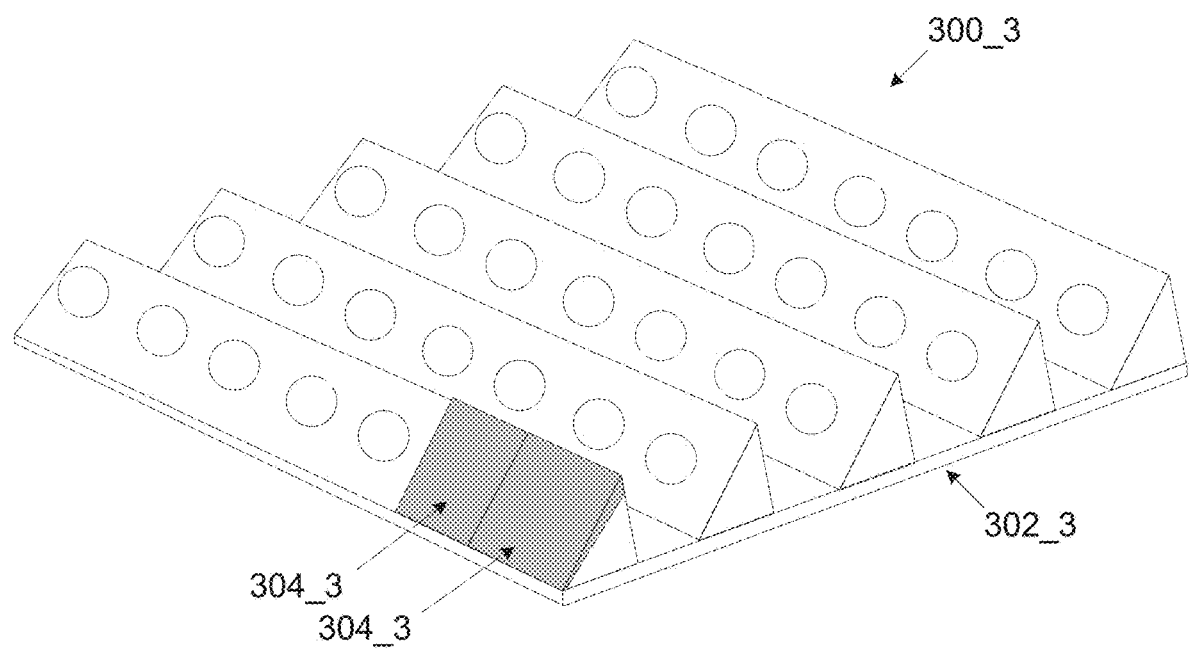
Figure 3C:
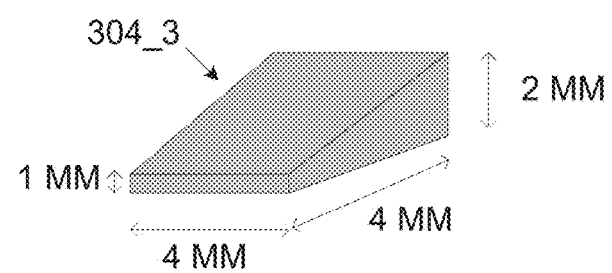

Reference is now made to FIG. 3A, FIG. 3B and FIG. 3C, which are schematic illustrations of exemplary building blocks of multi-image brick mosaics depicting a plurality of images from different view angles, according to some embodiments of the present invention.

As seen in FIG. 3A, an exemplary multi-image brick mosaic 300_1 may be constructed of one or more interlocking baseplates 302_1 comprising a plurality of bulges configured to enable affixing of bricks 304_1 in a firm interlocked manner while allowing easy assembly and disassembly of the bricks 304_1. In particular, the plurality of bricks 304_1 may be configured to have an angled top facet aligned to a certain angle, for example, 30°, 45°, 60°, 120°, 135°, 150° and/or the like with respect to the baseplate 302_1.

One or more of the baseplates 302 may further include one or more mechanical provisions 306 to support secure attachment of baseplates 302 to each other. The mechanical provisions 306 may include for example, an interlocking element, a clip element and/or the like which may enable connecting multiple baseplates 302 together to form a larger multi-image brick mosaic 300.

As seen in FIG. 3B, an exemplary multi-image brick mosaic 300_2 may be constructed of one or more interlocking baseplates 302_2 comprising a plurality of bulges configured to enable affixing of bricks 304_2 in a firm interlocked manner while allowing easy assembly and disassembly of the bricks 304_2. In particular, the baseplate(s) 302_2 may be configured to have a plurality of angled surfaces aligned to a certain angle, for example, 30°, 45°, 60°, 120°, 135°, 150° and/or the like such that when assembling the bricks 304_2 having a straight top facet (not angled) on the angled surfaces of the baseplate(s) 302_2, the top facet of the bricks 304_2 is angled in the respective angle of the angled surface.

As seen in FIG. 3C, an exemplary multi-image brick mosaic 300_3 may be constructed of one or more interlocking baseplates 302_3 comprising a plurality of bulges configured to enable affixing of bricks 304_3 in a firm interlocked manner while allowing easy assembly and disassembly of the bricks 304_3. In particular, the top facet of each of the plurality of bricks 304_3 is aligned to a first partial angle of a respective one of the plurality of angles, for example, 30°, 45°, 60°, 120°, 135°, 150° and/or the like while the baseplate(s) 302_3 may be configured to have a plurality of angled surfaces each aligned to a second partial angle of the respective angle. In particular, the sum of the first partial angle and the second partial angle equals the respective angle. As such, when the partially angled bricks 304_3 are assembled on the partially angled surfaces of the baseplate(s) 302_3, the top facet of each of the bricks 304_3 is in practice angled to a respective one of the plurality of angles with respect to the plane of the baseplate(s) 302_3.

The dimensions of the baseplate 302 and the bricks 304 is exemplary and should not be construed as limiting since the baseplates 302 and the bricks 304 may be configured, designed and/or produced in other dimensions. The density of the bricks 304 assembled on the baseplates 302 and their number may therefore also change accordingly, i.e. according to the size of the bricks 304. As such the resolution of the images portrayed by the bricks 304 may also vary depending on the size, number and/or density of the bricks 304. For example, large bricks 304 may allow for a smaller number of bricks to be assembled on the baseplate(s) 302 and may thus portray a lower resolution pixelated version of the image(s) compared to smaller bricks 304 which may support a large number of bricks to be assembled on the baseplate(s) 302 and thus portray a higher resolution pixelated version of the image(s).

Figure 4A:
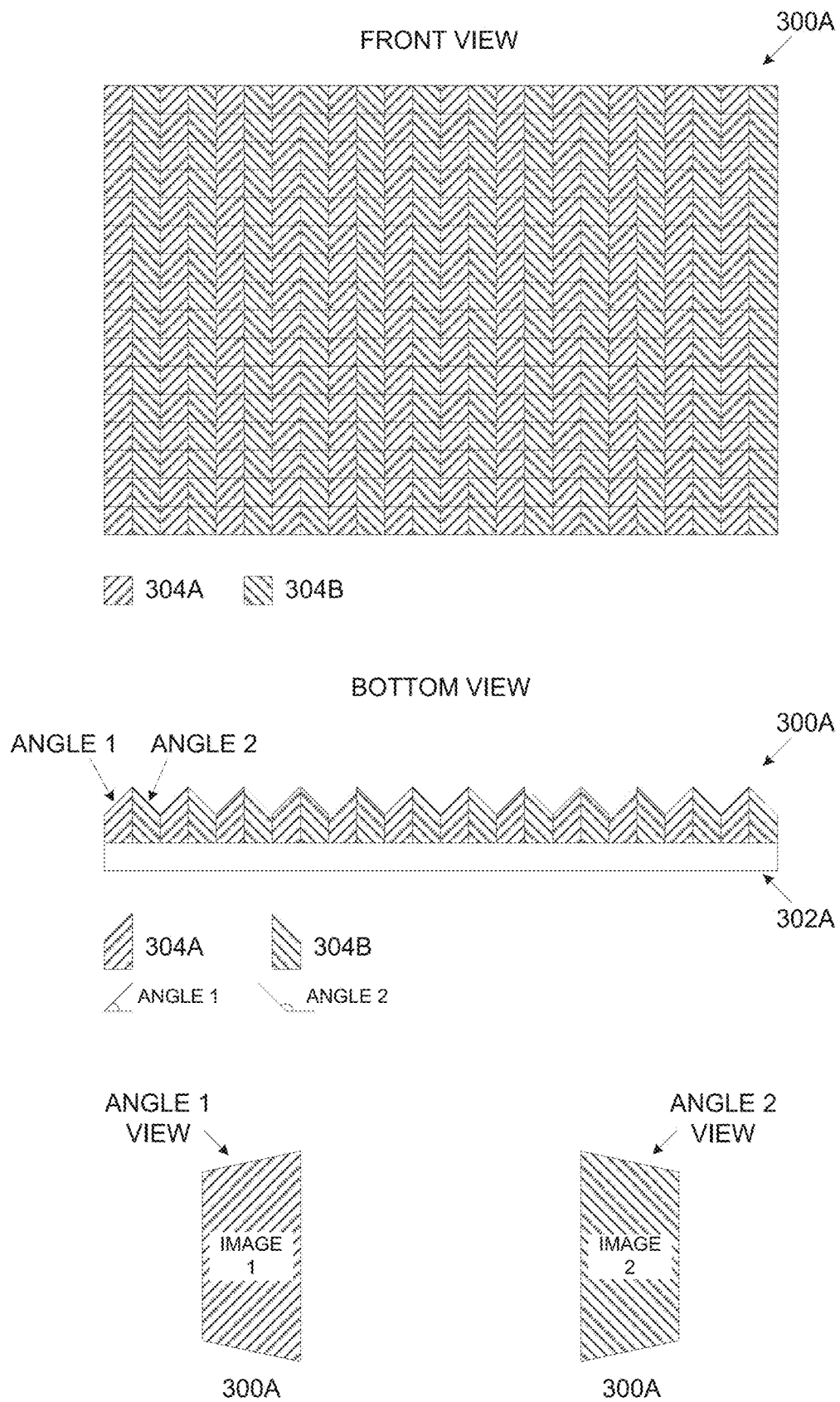
FIG. 4A FIG. 4B and FIG. 4C are schematic illustrations of exemplary multi-image brick mosaics depicting a plurality of different images from different view angles, according to some embodiments of the present invention.
Figure 4B:
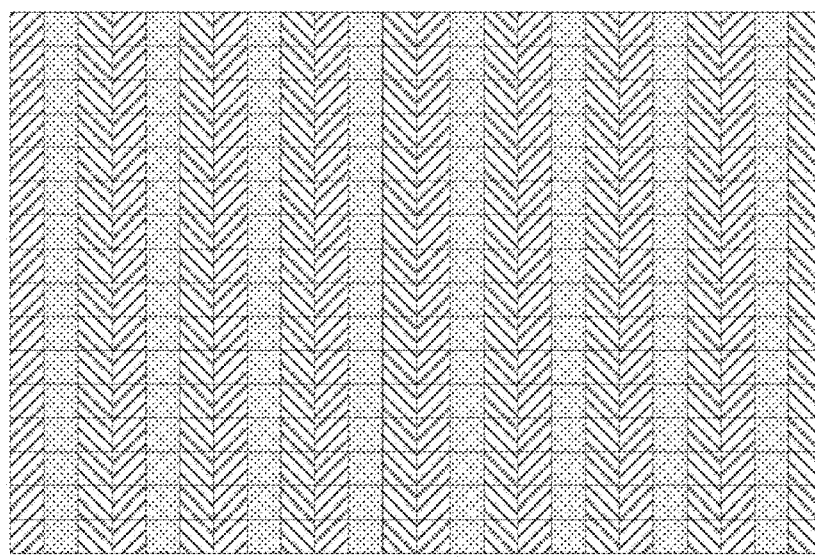
Figure 4B:
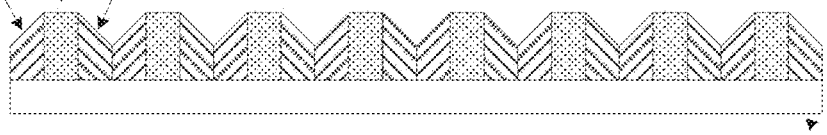
Figure 4B:
Figure 4B:
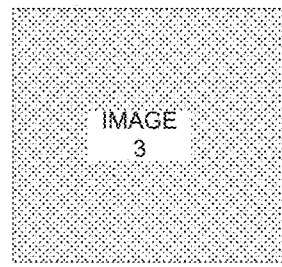
Figure 4B:
Figure 4C:
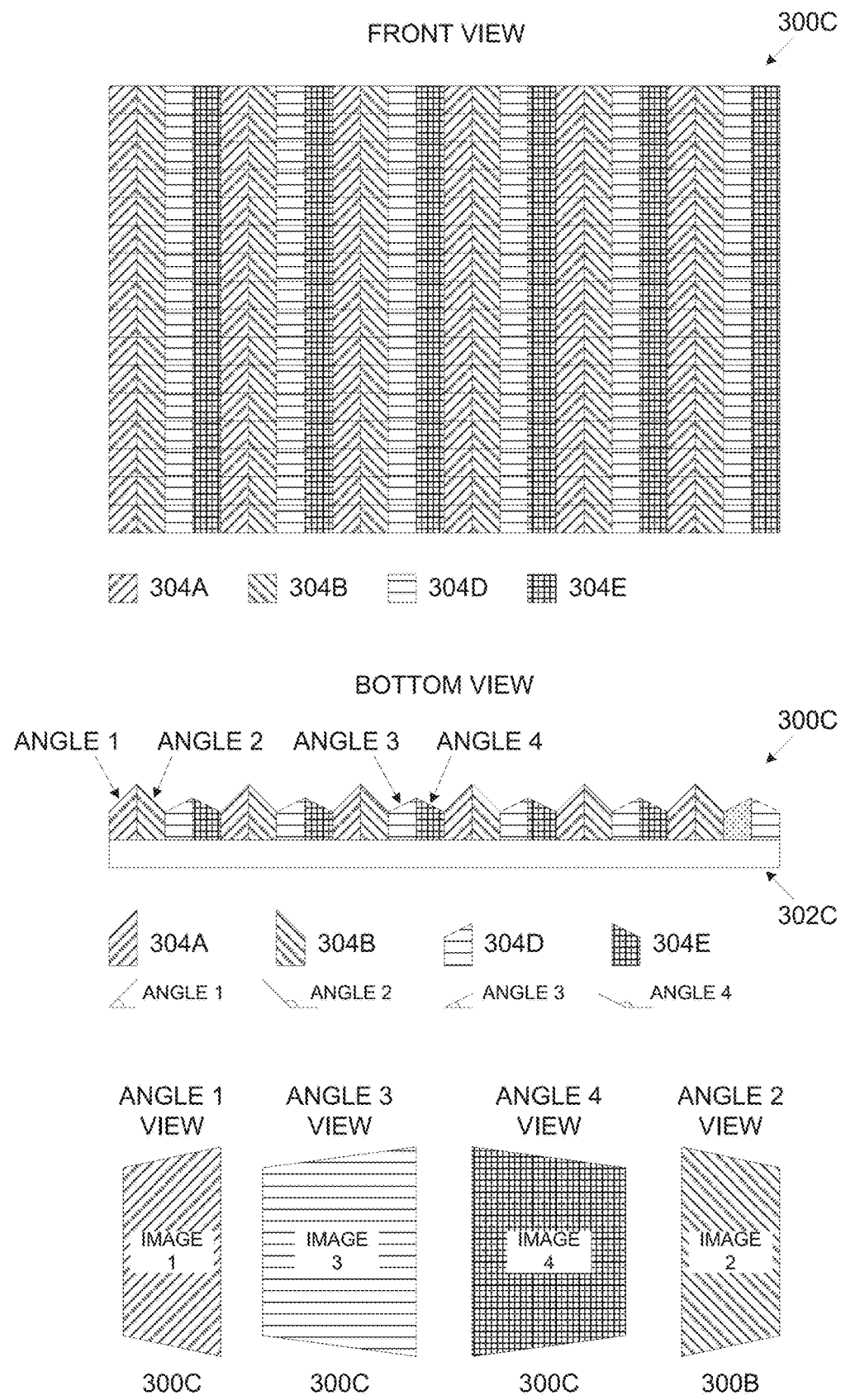

Reference is now made to FIG. 4A, FIG. 4B and FIG. 4C, which are schematic illustrations of exemplary multi-image brick mosaics depicting a plurality of different images from different view angles, according to some embodiments of the present invention.

As seen in FIG. 4A, an exemplary multi-image brick mosaic 300A such as the multi-image brick mosaic 300 may be constructed of one or more baseplates 302A such as the baseplate 302 affixed with a plurality of bricks such as the bricks 304. In particular, the multi-image brick mosaic 300A is configured to depict two images, an image 1 and an image 2. The multi-image brick mosaic 300A may therefore comprise two brick sets each associated with one of the images, for example, a first brick set associated with the first image and comprising a plurality of bricks 304A having a top facet (face) aligned to a first angle and a second brick set associated with the second image and comprising a plurality of bricks 304B having a top facet aligned to a second angle.

As seen in a bottom view of the multi-image brick mosaic 300A, the top facet of the bricks 304A may be aligned to the first angle, for example, a 70° angle with respect to the plane of the baseplate 302A while the top facet of the bricks 304B may be aligned to the second angle, for example, a 110° angle with respect to the plane of the baseplate 302A.

As seen in a front view of the multi-image brick mosaic 300A, the top facet of both the bricks 304A and the bricks 304B may be at least partially visible since the top facets are not in a sufficient acute angle with respect to the front line of sight.

However, when viewing the multi-image brick mosaic 300A from a viewing angle which is substantially aligned with the angle of the top fact of the bricks 304A, image 1 may be clearly seen since the top facets of the bricks 304A may be all aligned together in a plane which is substantially perpendicular to the line of sight of the spectator and forms the image 1. Similarly, when viewing the multi-image brick mosaic 300A from a viewing angle which is substantially aligned with the angle of the top fact of the bricks 304B, image 2 may be clearly seen since the top facets of the bricks 304B may be all aligned together in a plane which is substantially perpendicular to the line of sight of the spectator and forms the image 2.

As such, when the spectator is located in the first angle (e.g. 70°) with respect to the multi-image brick mosaic 300A, such that his line of sight is substantially perpendicular to the top facet of the bricks 304A, the spectator my easily discern the first image (image 1) since the top facets of the bricks 304A may be fully visible to him while the top facets of the bricks 304B are invisible. However, when the spectator is located in the second angle (e.g.) 110° with respect to the multi-image brick mosaic 300A, such that his line of sight is substantially perpendicular to the top facet of the bricks 304B, the spectator my easily discern the second image (image 2) since the top facets of the bricks 304B may be fully visible to him while the top facets of the bricks 304A are invisible.

As seen in FIG. 4B, an exemplary multi-image brick mosaic 300B such as the multi-image brick mosaic 300 may be constructed of one or more baseplates 302B such as the baseplate 302 affixed with a plurality of bricks such as the bricks 304. In particular, the multi-image brick mosaic 300B is configured to depict three images, an image 1, an image 2 and an image 3. The multi-image brick mosaic 300B may therefore comprise three brick sets each associated with one of the images, for example, a first brick set associated with the first image and comprising a plurality of bricks 304A having a top facet aligned to a first angle, a second brick set associated with the second image and comprising a plurality of bricks 304B having a top facet aligned to a second angle and a third brick set associated with the third image and comprising a plurality of bricks 304C having a top facet aligned to a third angle.

As seen in a bottom view of the multi-image brick mosaic 300B, the top facet of the bricks 304A may be aligned to the first angle, for example, a 70° angle with respect to the plane of the baseplate 302B, the top facet of the bricks 304B may be aligned to the second angle, for example, a 110° angle with respect to the plane of the baseplate 302C and the top facet of the bricks 304C may be aligned to the third angle, for example, a 180° angle (in this case a 180° angle is equivalent to a 0° angle) with respect to the plane of the baseplate 302B (i.e., parallel to the baseplate 302B).

As seen in a front view of the multi-image brick mosaic 300B, the top facet of all the bricks 304A, 304B, 304C and 304D may be at least partially visible since the top facets are not in a sufficient acute angle with respect to the front line of sight.

However, when viewing the multi-image brick mosaic 300A from a viewing angle which is substantially aligned with the angle of the top fact of the bricks 304A, 304B, 304C or 304DB, image 1, image 2, image 3 and image 4 respectively may be clearly seen. As such, when the spectator is located in the first angle (e.g. 70°) with respect to the multi-image brick mosaic 300B, such that his line of sight is substantially perpendicular to the top facet of the bricks 304A, the spectator my easily discern the first image (image 1) since the top facets of the bricks 304A may be fully visible to him while the top facets of the bricks 304B, 304C and 304D are invisible or at least mostly invisible. When the spectator is located in the second angle (e.g. 110°) with respect to the multi-image brick mosaic 300B, such that his line of sight is substantially perpendicular to the top facet of the bricks 304B, the spectator my easily discern the second image (image 2) since the top facets of the bricks 304B may be fully visible to him while the top facets of the bricks 304A and 304C are invisible or at least mostly invisible. When the spectator is located in the third angle (e.g. 180°) with respect to the multi-image brick mosaic 300B, such that his line of sight is substantially perpendicular to the top facet of the bricks 304C, the spectator my easily discern the third image (image 3) since the top facets of the bricks 304C may be fully visible to him while the top facets of the bricks 304A and 304B are invisible or at least mostly invisible.

As seen in FIG. 4C, an exemplary multi-image brick mosaic 300C such as the multi-image brick mosaic 300 may be constructed of one or more baseplates 302C such as the baseplate 302 affixed with a plurality of bricks such as the bricks 304. In particular, the multi-image brick mosaic 300C is configured to depict four images, an image 1, an image 2, an image 3 and an image 4. The multi-image brick mosaic 300C may therefore comprise four brick sets each associated with one of the images, for example, a first brick set associated with the first image and comprising a plurality of bricks 304A having a top facet aligned to a first angle, a second brick set associated with the second image and comprising a plurality of bricks 304B having a top facet aligned to a second angle, a third brick set associated with the third image and comprising a plurality of bricks 304D having a top facet aligned to a third angle and a fourth brick set associated with the fourth image and comprising a plurality of bricks 304E having a top facet aligned to a fourth angle.

As seen in a bottom view of the multi-image brick mosaic 300C, the top facet of the bricks 304A may be aligned to the first angle, for example, a 70° angle with respect to the plane of the baseplate 302C, the top facet of the bricks 304B may be aligned to the second angle, for example, a 110° angle with respect to the plane of the baseplate 302C, the top facet of the bricks 304D may be aligned to the third angle, for example, a 40° angle with respect to the plane of the baseplate 302C and the top facet of the bricks 304E may be aligned to the fourth angle, for example, a 140° angle with respect to the plane of the baseplate 302C.

As seen in a front view of the multi-image brick mosaic 300C, the top facet of all the bricks 304A, 304B, 304D and 304E may be at least partially visible since the top facets are not in a sufficient acute angle with respect to the front line of sight.

However, when viewing the multi-image brick mosaic 300C from a viewing angle which is substantially aligned with the angle of the top fact of the bricks 304A, 304B, 304D or 304E, image 1, image 2, image 3 and image 4 respectively may be clearly seen. As such, when the spectator is located in the first angle (e.g. 70°) with respect to the multi-image brick mosaic 300C, such that his line of sight is substantially perpendicular to the top facet of the bricks 304A, the spectator my easily discern the first image (image 1) since the top facets of the bricks 304A may be fully visible to him while the top facets of the bricks 304B, 304D and 304E are invisible or at least mostly invisible. Similarly, when the spectator is located in the second angle (e.g. 110°) with respect to the multi-image brick mosaic 300C, such that his line of sight is substantially perpendicular to the top facet of the bricks 304B, the spectator my easily discern the second image (image 2) since the top facets of the bricks 304B may be fully visible to him while the top facets of the bricks 304A, 304D and 304E are invisible or at least mostly invisible. Also, when the spectator is located in the third angle (e.g. 40°) with respect to the multi-image brick mosaic 300C, such that his line of sight is substantially perpendicular to the top facet of the bricks 304D, the spectator my easily discern the third image (image 3) since the top facets of the bricks 304D may be fully visible to him while the top facets of the bricks 304A, 304B and 304D are invisible or at least mostly invisible. Finally, when the spectator is located in the fourth angle (e.g. 140°) with respect to the multi-image brick mosaic 300C, such that his line of sight is substantially perpendicular to the top facet of the bricks 304D, the spectator my easily discern the fourth image (image 4) since the top facets of the bricks 304D may be fully visible to him while the top facets of the bricks 304A, 304B and 304D are invisible or at least mostly invisible.

The embodiments of the multi-image brick mosaic 300 presented in FIG. 3A, FIG. 3B, FIG. 4A, FIG. 4B and FIG. 4C present bricks 304 configured, selected and/or designed to have their top facet aligned to one or more angles in a certain axis with respect to the plane of the baseplate(s) 302, specifically horizontal angles such that the top facets are visible to a spectator viewing the multi-image brick mosaic 300 from the front. This, however, should not be construed as limiting since one or more of the brick sets may comprise bricks 304 configured, selected and/or designed to have their top facet aligned to one or more angles in one or more other axes with respect to the plane of the baseplate(s) 302, for example, a vertical axis angle such that the top facets are visible to a spectator viewing the multi-image brick mosaic 300 from a vertical angle, for example, a high vertical angle from above the multi-image brick mosaic 300, a low vertical angle from beneath the multi-image brick mosaic 300 and/or the like.

Reference is made once again to FIG. 1.

As shown at 102, the process 100 starts with receiving a plurality of images, specifically high resolution images having a first number of pixels.

Receiving the images may be done, for example, by the brick mosaic editor 220 executed by the client device 202 and operated by the user 204 to select the images and load them to the brick mosaic editor 220. The user 204 may select one or more images which may be stored, for example, in one or more local storage resources, for example, the storage 214, an attachable device attached to the client device 202, for example, a memory card, a Universal Serial Bus (USB) accessory and/or the like. However, the user 204 may load may select one or more images stored in one or more of the remote networked resources 250, for example, a storage server, an image storage service, a cloud gallery and/or the like.

One or more of the images may be private images of the user 204, for example, a photograph captured by the user 204, a painting painted by the user 204 and/or the like. However, one or more of the images may be taken from a public domain, either for free and/or in exchange to a payment, for example, an image of a painting hanging in a museum, a photograph uploaded to the internet and/or the like.

As shown at 104, each of the received images is converted to a respective pixelated image having a second number of pixels smaller than the first number and thus each pixelated image may depict a pixelated version of the respective image.

As stated herein before, the process 100 may be conducted by the brick mosaic editor 220 executed by the client device 202, by one or more remote resources, for example, the brick mosaic kit manager 240 executed by the brick mosaic management system 206 and/or by a combination thereof. Therefore, according to some embodiments, the images conversion may be done by the brick mosaic editor 220 at the client device 202. However, according to one or more other embodiments, the images conversion may be done remotely, for example, by the brick mosaic kit manager 240. In such case, the brick mosaic editor 220 may transmit (upload) the received images, via the network 208, to the brick mosaic management system 206 which may convert the images to the pixelated images.

While each of the received images may have a different resolution and thus a different first number of pixels, the second number of pixels may be typically the same for all the pixelated images created for all the received images. This is because all the images are eventually portrayed by a single multi-image brick mosaic such as the multi-image brick mosaic 300 which is substantially symmetrical in its size, number of bricks 304 and their density in all directions, i.e., in all viewing angles.

Specifically, the second number of pixels may be defined by the number of bricks 304 selected for the multi-image brick mosaic 300 which defines the number of pixels in the pixelated images since each brick may be mapped to a respective pixel in a respective one of the pixelated images. For example, assuming a size of the multi-image brick mosaic 300 is selected to be 300×200 bricks 304, the second number of pixels in each of the pixelated images will be 300×200=6,000 pixels.

The size of the multi-image brick mosaic 300 may be selected by the user 204 using the brick mosaic editor 220.

In addition to the number of bricks 304, the size selected for the multi-image brick mosaic 300 may dictate the number of baseplates 302 that are required for the multi-image brick mosaic 300.

One or more methods and/or techniques as known in the art may be applied for converting the images having one or more first numbers of pixels to pixelated images having the second number of pixels which is smaller than the first number(s). For example, each pixel in each pixelated image may map a respective group of adjacent pixels in a respective one of the received high resolution images, for example, an 8×8 block, a 16×16 block, a 16×8 block, an 8×16 block, a 24×24 block and/or the like.

Optionally, the user 204 using the brick mosaic editor 220 may apply one or more transformations and/or manipulations to one or more of the received images before or after they are converted. Manipulating the image(s) may include, for example, zooming into a certain region of the image to select a preferred portion of the image. In another example, the manipulation of the image(s) may include panning the image along one or more axes. In another example, the manipulation of the image(s) may include rotating the image in a certain direction. In another example, the manipulation of the image(s) may include shifting the image in a certain direction such that part of it is not visible. In another example, the manipulation of the image(s) may include converting the image into a grey scale and/or a black and white image. In another example, the manipulation of the image(s) may include dithering the image and/or part thereof, for example, to create a black and white image.

As shown at 106, the color of each pixel in each of the pixelated images may be selected based on a color analysis of the respective group of pixels mapped by the respective pixel.

As stated herein before, the process 100 may be conducted by the brick mosaic editor 220 executed by the client device 202, by one or more remote resources, for example, the brick mosaic kit manager 240 executed by the brick mosaic management system 206 and/or by a combination thereof. Therefore, according to some embodiments, the color selection may be done by the brick mosaic editor 220 at the client device 202. However, according to other embodiments, the color mapping may be done remotely, for example, by the brick mosaic kit manager 240. In such case, the brick mosaic kit manager 240 may select the colors of the pixels of the pixelated images created by the brick mosaic editor 220 and transmitted (uploaded) to the brick mosaic management system 206 via the network 208 or in pixelated images created by the brick mosaic kit manager 240 itself.

In particular, the color of each brick may be selected from a limited color palette, i.e., a limited number of colors, for example, 16, 24, 32, 48, 64 and/or the like. Optionally, the colors available for the color selection, the number of colors and/or the color range in the color palette are defined by the user 204, using the brick mosaic editor 220.

Selecting the color of each pixel of in each of the pixelated images may be done according to one or more manipulations of the colors of the pixels of the respective group mapped by the respective pixel in each pixelated image. For example, the color of each pixel in each of the pixelated images may be selected by aggregating the colors of the pixels of the respective group mapped by the respective pixelated image pixel, for example, averaging the colors of the pixels of the respective group, blending the colors of the pixels of the respective group and/or the like. In another example, the color of each pixel in each of the pixelated images may be selected by manipulating the colors of the pixels of the respective group mapped by the respective pixelated image pixel according to one or more predefined and/or selected formulations which may map the colors of the pixels of the respective group to a certain color of the limited palette.

Optionally, the user 204, using the brick mosaic editor 220 may adjust one or more color attributes of one or more pixels in one or more of the pixelated images each constructed from the second number of pixels. To this end, the GUI provided by the brick mosaic editor 220 may include one or more adjustment tools (e.g. drawing tool, brush tool, paint tool, etc.) enabling the user 204 to navigate in one or more of the pixelated images and adjust one or more of the pixels in these pixelated images. The color attributes may include, for example, brightness, contrast, saturation, High Dynamic Range (HDR) and/or the like. For example, the user 204 may adjust one or more attributes of one or more of the pixels in a certain pixelated image to adjust a background of the certain pixelated image. In another example, the user 204 may adjust one or more attributes of one or more of the pixels in a certain pixelated image to add a text to the certain pixelated image. The GUI may be configured to provide one or more text editing tools to enable the user 204 to insert, remove and/or edit text as overlay, underlay and/or the like in the pixelated image. Moreover, the user 204 using the brick mosaic editor 220 may select one or more visual attributes, for example, a font, a size, a front color, a background color and/or the like for each text symbol added to the certain pixelated image. In another example, the user 204 may adjust one or more attributes of one or more of the pixels in a certain pixelated image to add one or more symbols to the certain pixelated image. Moreover, the user 204 using the brick mosaic editor 220 may select one or more visual attributes of the added symbol, for example, a size, a front color, a background color and/or the like.

As shown at 108, kit instructions may be computed for preparing (creating) a kit that may be used for building the multi-image brick mosaic 300 to depict the optionally adjusted pixelated images derived from the images selected by the user 204.

The computed kit instructions may be provided in one or more forms, for example, a list, a map, a table, and/or the like.

As described herein before, each of the brick sets is associated with a respective one of the received images, specifically with a respective one of the pixelated images derived from the received images. Each of the bricks 304 of each of the brick sets may be thus mapped to a respective pixel in the respective associated pixelated image. Each brick 304 or at least its top facet may be therefore painted in the color selected for the respective pixel to which the respective brick 304 is mapped.

The kit instructions may be therefore computed to define the baseplates 302 and the bricks 304 to be included in the kit. In particular, the computed kit instructions may define the type, size and/or arrangement of the baseplates according to the size of the multi-image brick mosaic 300 as initially set and/or defined by the user 204. The kit instructions may also define the overall number of bricks 304 in each of the brick sets according to the size of the multi-image brick mosaic 300. The kit instructions may be computed to further define the construction of each brick set, i.e. the number of bricks 304 of each color. These kit instructions may be computed based on the color selected for each of the pixels of the respective pixelated image associated with the respective brick set. As described herein before, the top facet of all of the bricks 304 of each brick set are aligned to a respective angle such that the bricks 304 of each brick set have top facets aligned to different angles.

As shown at 110, assembly instructions may be computed for using the kit prepared according to the kit instructions for building the multi-image brick mosaic 300. Specifically, the assembly instructions may be computed to instruct assembly of the bricks 304 included in the kit on the baseplate(s) 302 to from the multi-image brick mosaic 300 depicting the plurality of images, specifically the pixelated images each from a different viewing angle.

The computed assembly instructions may be provided in one or more forms, for example, a list, a map, a table, and/or the like.

Again, as stated herein before, since the process 100 may be conducted by the brick mosaic editor 220, by the brick mosaic kit manager 240 and/or by a combination thereof, the kit instructions and/or the assembly instructions may be computed by the brick mosaic editor 220 and/or by the brick mosaic kit manager 240. In case the instructions are computed by the brick mosaic kit manager 240 while one or more of the previous steps 102, 104 and/or 106 are conducted by the brick mosaic editor 220, the brick mosaic editor 220 may transmit the pixelated images and the colors selected for their pixels to the brick mosaic kit manager 240 via the network 208.

Optionally, the user 204, using the brick mosaic editor 220 may preview a simulation of the multi-image brick mosaic 300 built according to the assembly instructions using the kit prepared according to the kit instructions. The simulated preview presented to the user 204 may be generated by the brick mosaic editor 220 itself. However, the simulated preview may be generated remotely, for example, by the brick mosaic kit manager 240 which may transmit presentation instructions to the brick mosaic editor 220 to present the simulated preview to the user 204.

Optionally, the simulated preview may support changing the viewing angle of the simulated multi-image brick mosaic 300 such that the user 204 may view the simulated multi-image brick mosaic 300 from different angles and may be able to view the plurality of images from the respective viewing angles.

Optionally, the simulated preview presented to the user 204 may be animated, such that the multi-image brick mosaic 300 may be simulated over one or more predefined backgrounds, for example, one or more wall textures, one or more wall shades, one or more room environments (e.g. living room, bedroom, children room, kitchen, etc.) and/or the like.

To this end, the GUI provided by the brick mosaic editor 220 may include one or more preview simulation tools, for example, a navigation bar, a viewing angle selector, an animation selector and/or the like to enable the user 204 to navigate and select one or more settings for the simulated preview of the multi-image brick mosaic 300.

Reference is now made to FIG. 5A, FIG. 5B, FIG. 5C, FIG. 5D, FIG. 5E, FIG. 5F, FIG. 5G and FIG. 5H, which are exemplary kit instructions computed for creating a kit of for an exemplary multi-image brick mosaic and assembly instructions for building the exemplary multi-image brick mosaic using the kit, according to some embodiments of the present invention.

A user such as the user 204 may use a brick mosaic editor such as the brick mosaic editor 220 to design a multi-image brick mosaic such as the multi-image brick mosaic 300, specifically a multi-image brick mosaic such as the multi-image brick mosaic 300A configured to depict two different images when viewed from two different viewing angles. Using the brick mosaic editor 220, the user 204 may further define a desired size of the of the multi-image brick mosaic 300A he designs.

As described herein before, the process 100 conducted with respect to the including computing the kit instructions and the assembly instructions may be done by the brick mosaic editor 220, by the brick mosaic kit manager 240 and/or by a combination thereof. However, for brevity, computing the kit instructions and the assembly instructions for the multi-image brick mosaic 300A is described for FIG. 5A, FIG. 5B, FIG. 5C, FIG. 5D, FIG. 5E, FIG. 5F, FIG. 5G and FIG. 5H to be conducted by the brick mosaic editor 220.

Figure 5A:
Figure 5A:
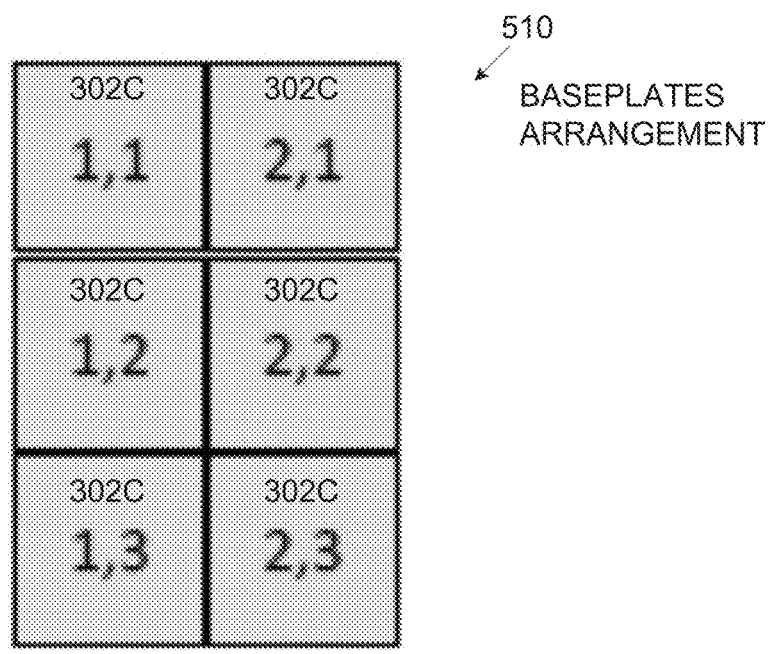

A seen in FIG. 5A, a first exemplary pixelated image 500A and a second 500B exemplary pixelated image 500A may be derived, as described in the process 100, from the images selected by the user 204 using the brick mosaic editor 220. Specifically, the pixelated images 500A and 500B are created based on the size defined by the user 204 for the multi-image brick mosaic 300A.

As further seen in FIG. 5A, the brick mosaic editor 220 may determine that based on the size of the multi-image brick mosaic 300A defined by the user 204, the multi-image brick mosaic 300A may be constructed from 6 baseplates 302C such as the baseplate 302 each having a 32×32 bulges which are arranged according to arrangement 510 in a 2×3 portrait layout.

The brick mosaic editor 220 may further determine based on the selected baseplates and the size of the pixelated images 500A and 500B that the total number of bricks such as the bricks 304 may be 2×3×32×32=6,144 bricks. Specifically, the bricks 304 may be split into two brick sets each associated with respective one of the pixelated images 500A and 500B and comprising 3,072 bricks. The first brick set may include a plurality of bricks 304, for example, bricks such as the bricks 304A having a top facet aligned to a first angle, for example, 40° while the second brick set may include a plurality of bricks 304, for example, bricks such as the bricks 304B having a top facet aligned to a second angle, for example, 130°.

It should be noted that since the multi-image brick mosaic 300A is designed to depict only two pixelated images, namely 500A and 500B, the bricks 304A and 304B may be implemented with a single type of bricks designated 304X which have their top facet aligned to the same angle, for example, 40°. However, the bricks 304X of the first brick set associated with the first pixelated image 500A may be assembled with the angled facet facing one direction and their angle may be therefore 40° while the bricks 304X of the second brick set associated with the second pixelated image 500B may be assembled with the angled facet facing the other direction and their angle may be therefore 130°.

As seen in FIG. 5B, the brick mosaic editor 220 may select the color for each of the bricks 304A and 304B, specifically the bricks 304X and may compute the total number of bricks 304A and 304B per color. The brick mosaic editor 220 may further generate a color code index mapping each of the selected colors to a certain number.

Figure 5C:
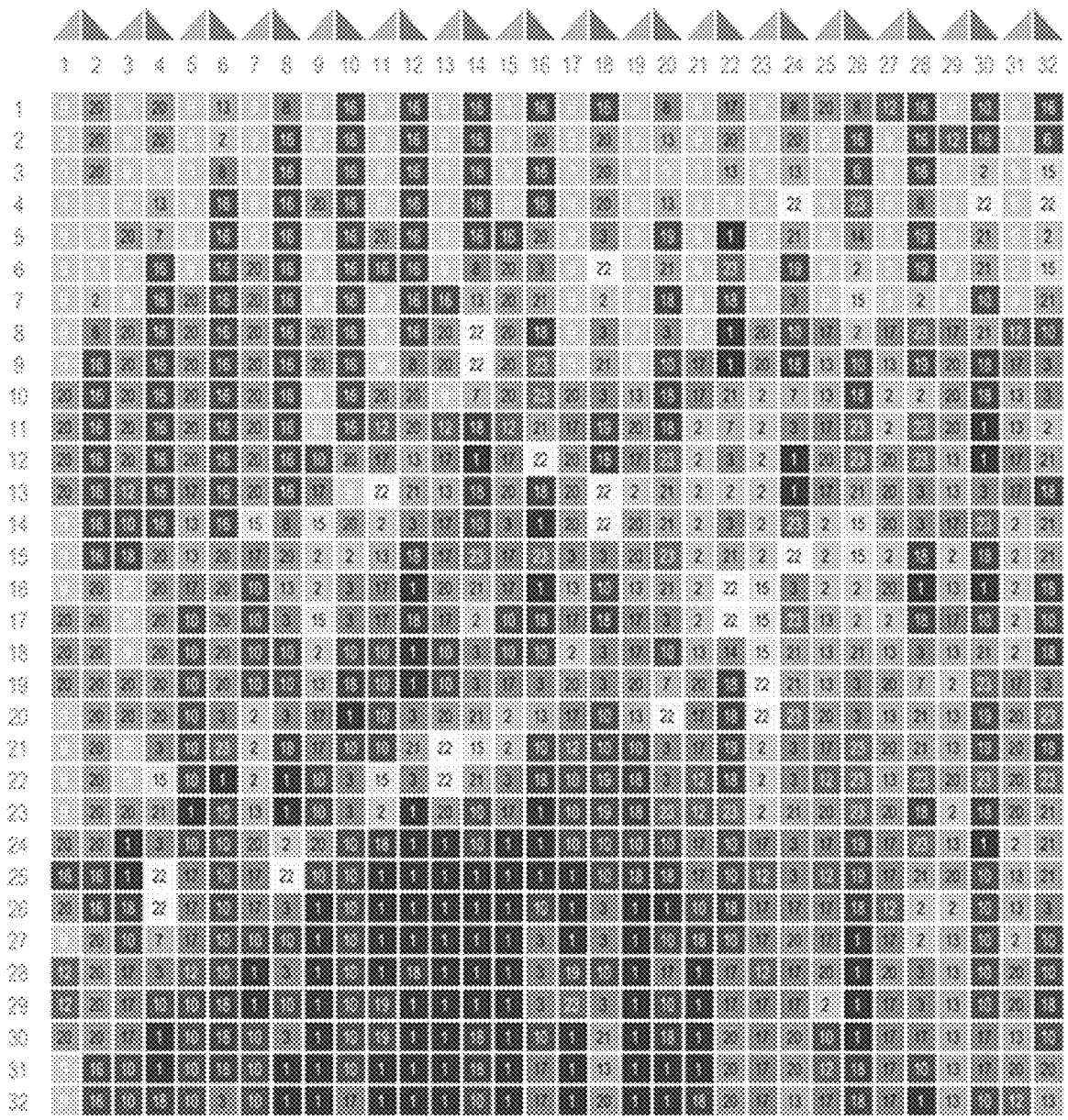
Figure 5C:
Figure 5D:
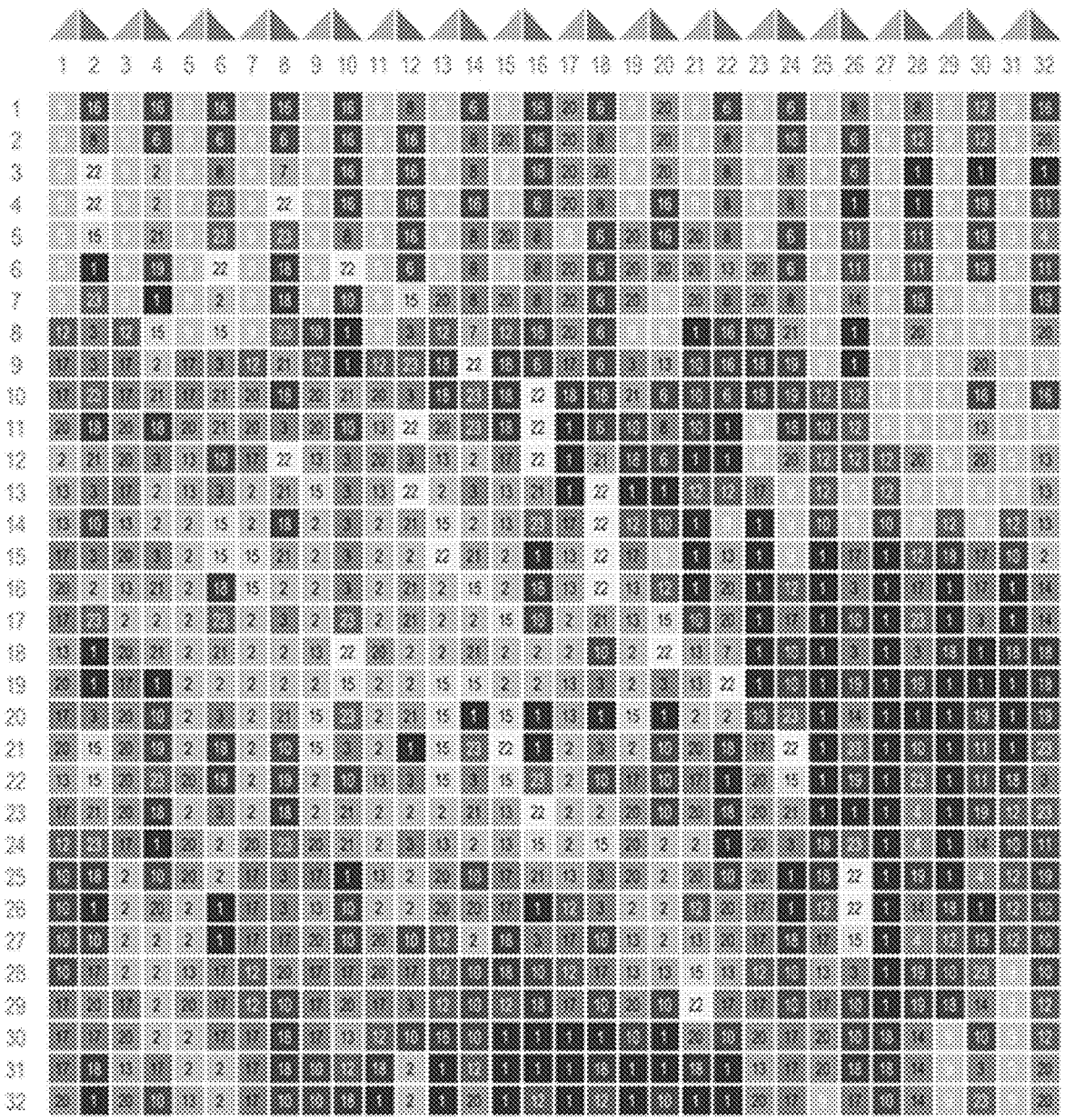
Figure 5D:
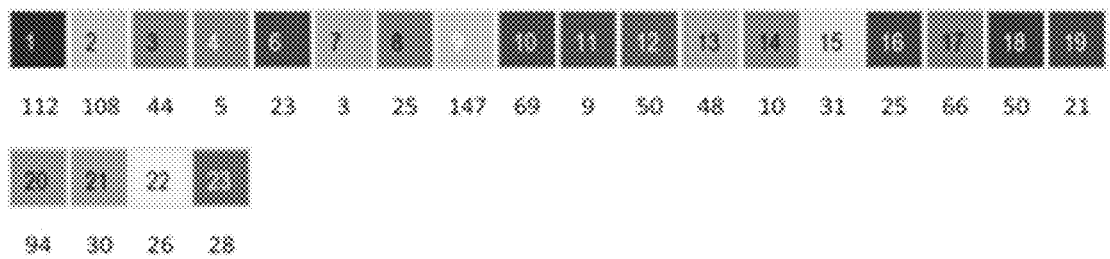
Figure 5E:
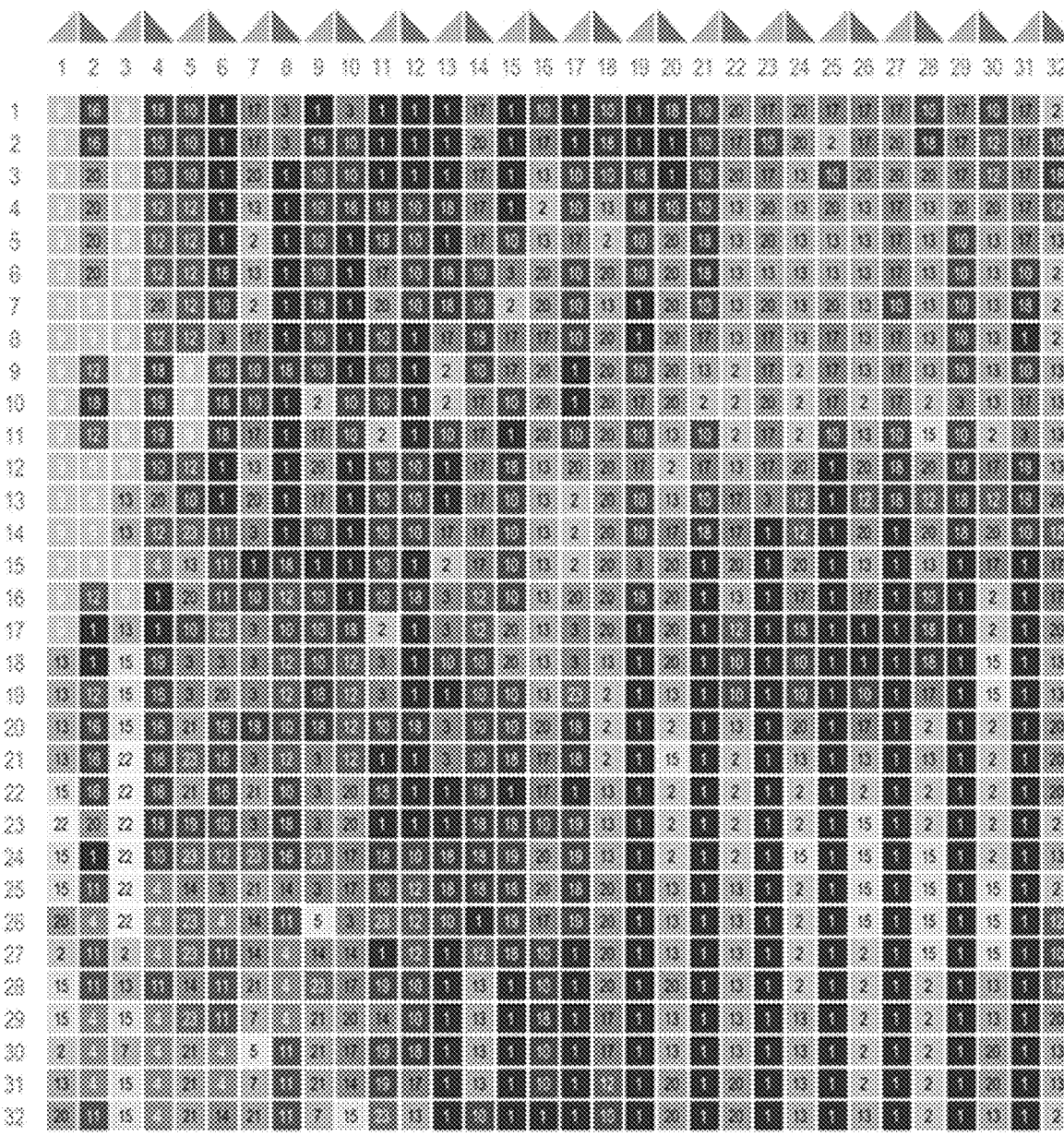
Figure 5E:
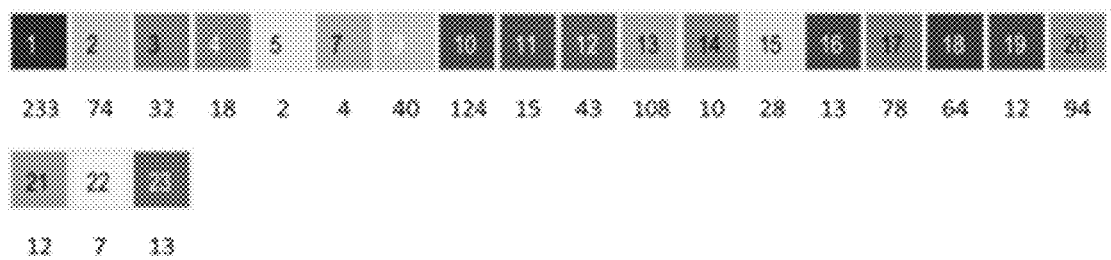
Figure 5F:
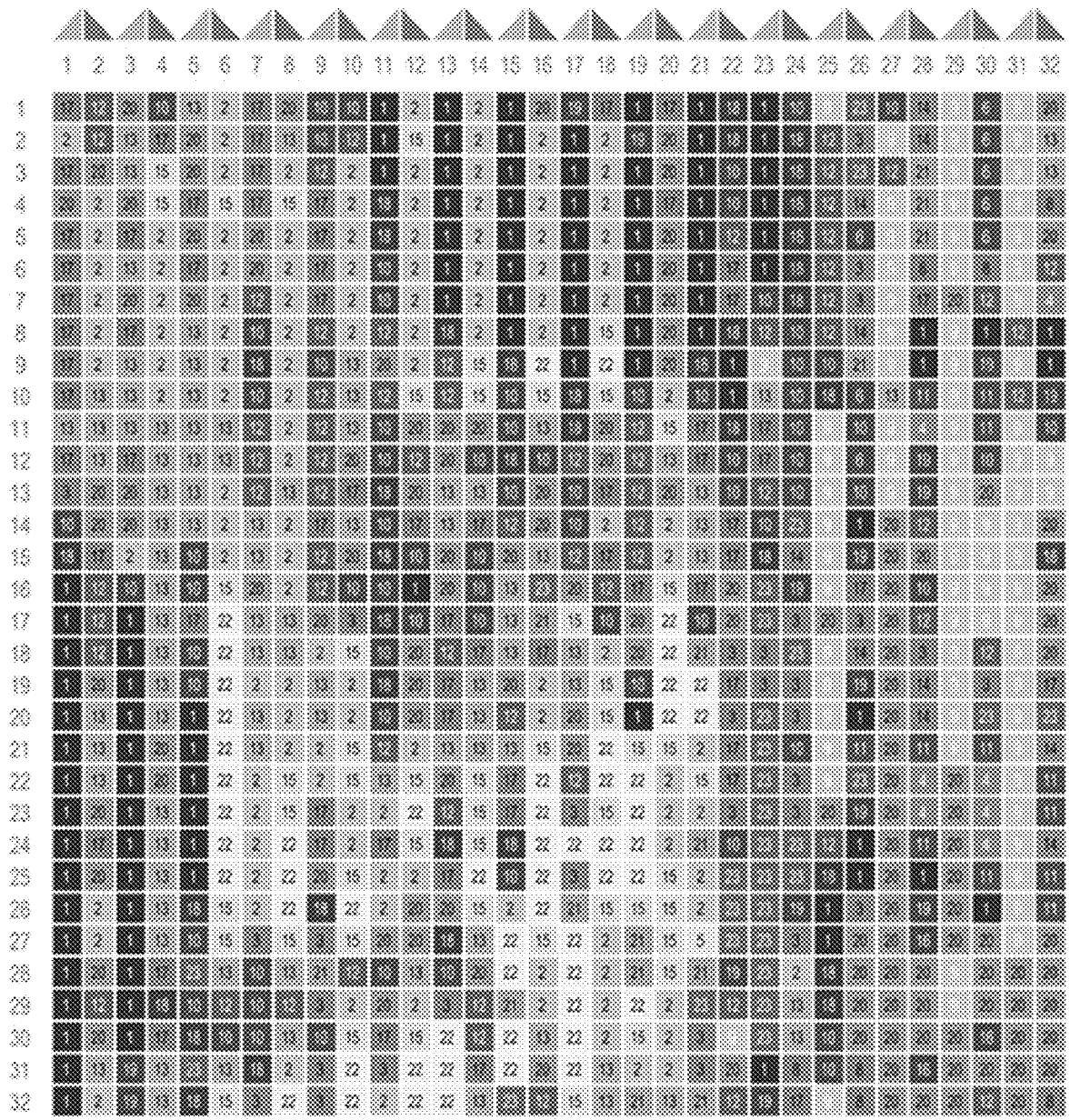
Figure 5F:
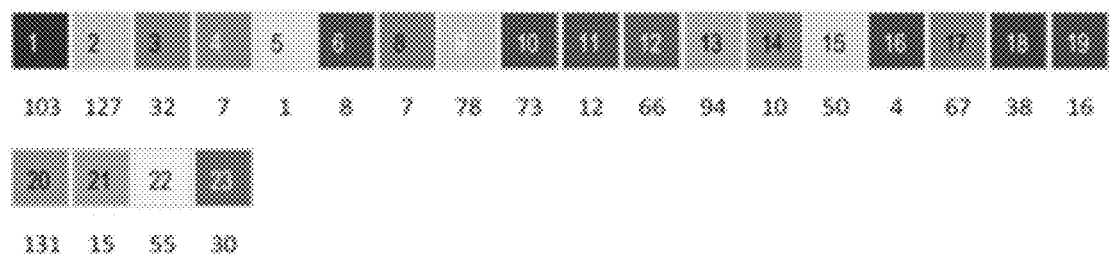
Figure 5G:
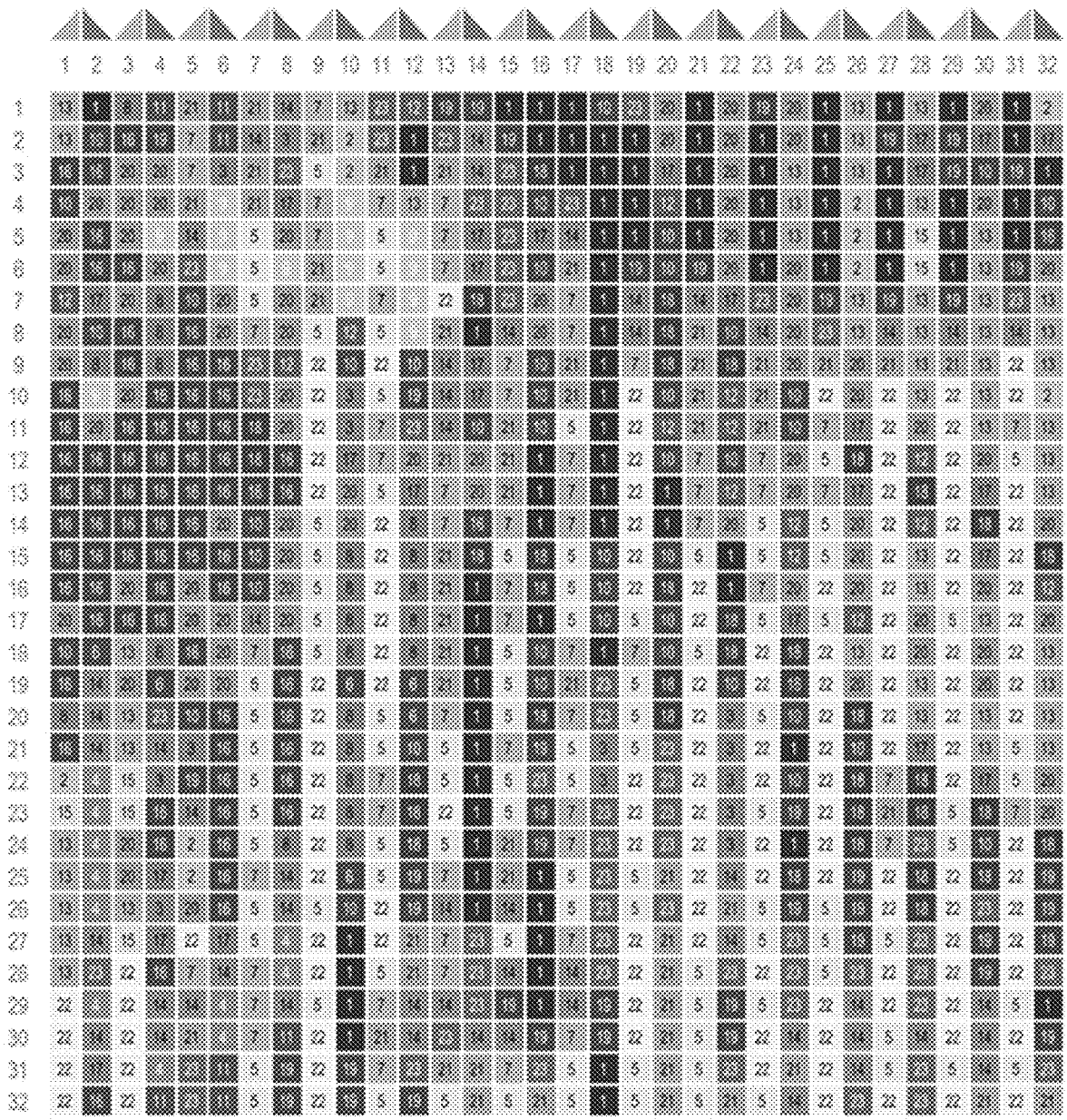
Figure 5G:
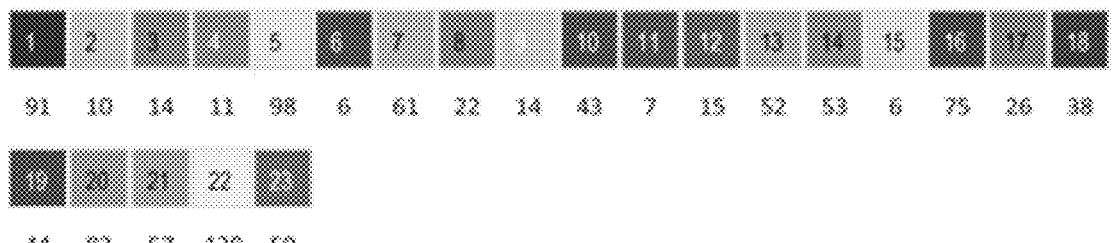
Figure 5H:
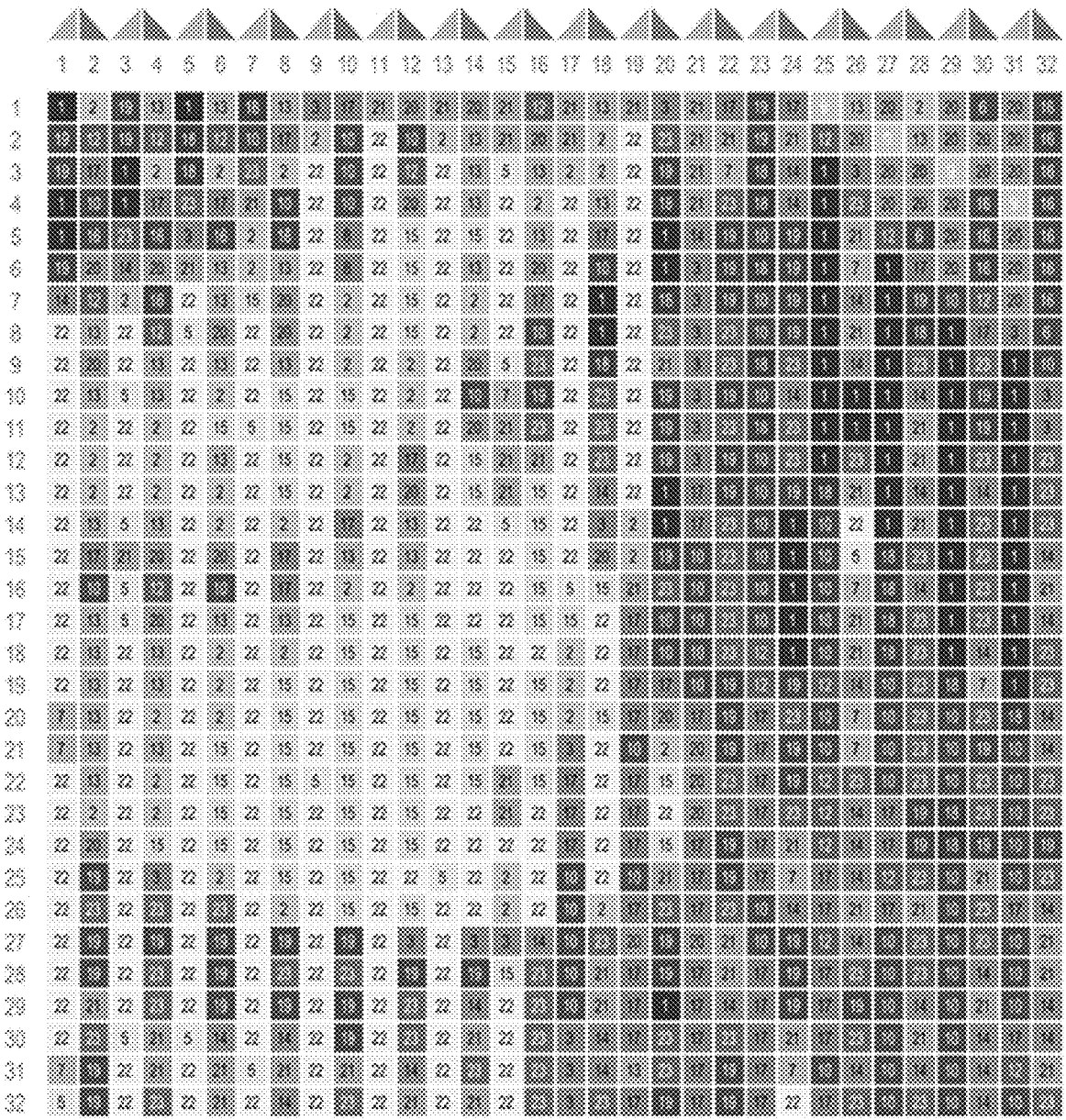
Figure 5H:
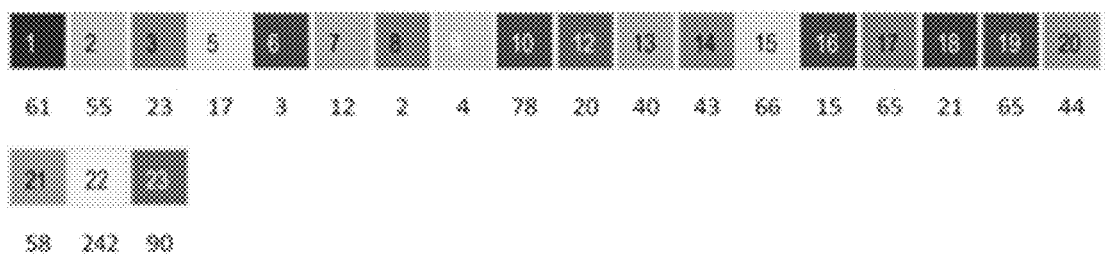

The kit instructions computed by the brick mosaic editor 220 may therefore include the following information:
  The type and number of baseplates 302C
  The arrangement 510 of the baseplates 302C
  The number of bricks 304X per color
  The color code index of the colors of the bricks 304X The brick mosaic editor 220 may further compute the assembly instructions for assembling the bricks 304X on the baseplates 302C. For example, the brick mosaic editor 220 may compute respective assembly instructions for each of the baseplates 302C separately. For example, as seen in FIG. 5C, the brick mosaic editor 220 may compute assembly instructions for assembling a first subset of the bricks 304X on a first baseplate 302C (1,1). The brick mosaic editor 220 may generate an assembly map in which each brick 304X is identified by a respective color code (number) indicated in a respective color code index applicable for the first baseplate 302C (1,1) which further indicates the overall number of bricks 304X per color. The assembly instructions further indicate that the bricks 304X assembled in the odd columns (first brick set) should be assembled with their top facet facing one direction (left) while the bricks 304X assembled in the even columns (second brick set) should be assembled with their top facet facing the other direction (right). Similarly, the brick mosaic editor 220 may compute assembly instructions and maps for each of the baseplates 302C, for example, as seen in FIG. 5D for the second baseplate 302C (2,1), as seen in FIG. 5E for the third baseplate 302C (1,2), as seen in FIG. 5F for the fourth baseplate 302C (2,2), as seen in FIG. 5G for the fifth baseplate 302C (1,3) and as seen in FIG. 5H for the sixth baseplate 302C (2,3).

Reference is made once again to FIG. 1.

As shown at 112, the brick mosaic editor 220 may output the kit instructions which may be used to prepare (create) the kit for building the multi-image brick mosaic 300, specifically the kit may include the selected baseplate(s) 302 and bricks 304. One or more kits prepared according to the kit instructions may be delivered, for example, shipped, sent, picked-up and/or the like to one or more users who may build the multi-image brick mosaic 300 using the kit.

The brick mosaic editor 220 may also output the assembly instructions which may be used to build the multi-image brick mosaic 300 using the components included in the kit, specifically the baseplate(s) 302 and the bricks 304 included in the kit. The kit(s) delivered to the user(s) may therefore further include the assembly instructions to enable the user(s) to build the multi-image brick mosaic 300 using the kit components according to the assembly instructions.

After assembling the multi-image brick mosaic 300 according to the assembly instructions using the kit created according to the kit instructions, the multi-image brick mosaic 300 may depict the plurality of pixelated images each from a different viewing angle.

Figure 6A:
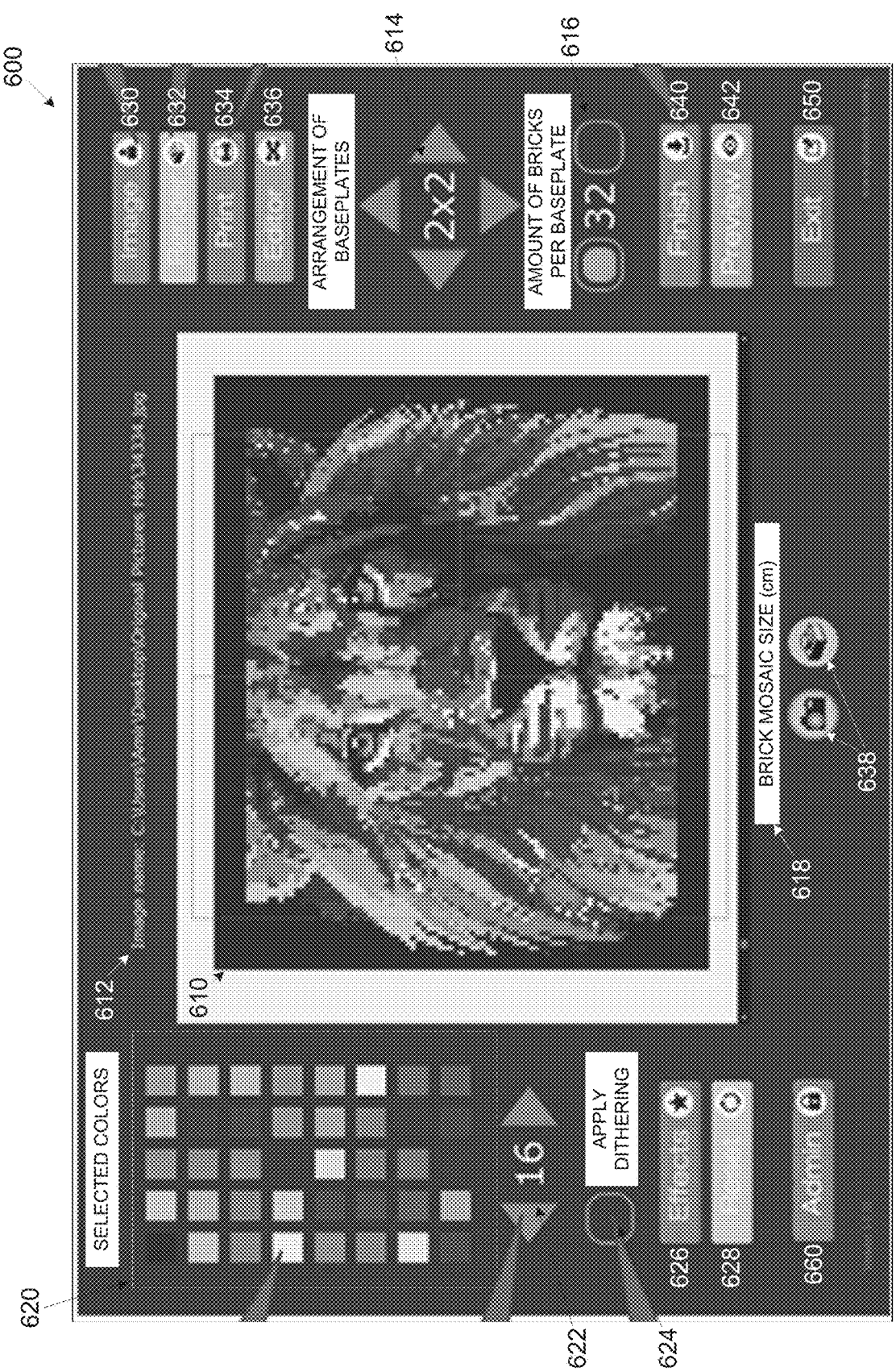
FIG. 6A and FIG. 6B are screen shots of an exemplary GUI configured to enable a user to design a multi-image brick mosaic depicting each of a plurality of images from a different view angle, according to some embodiments of the present invention.
Figure 6B:
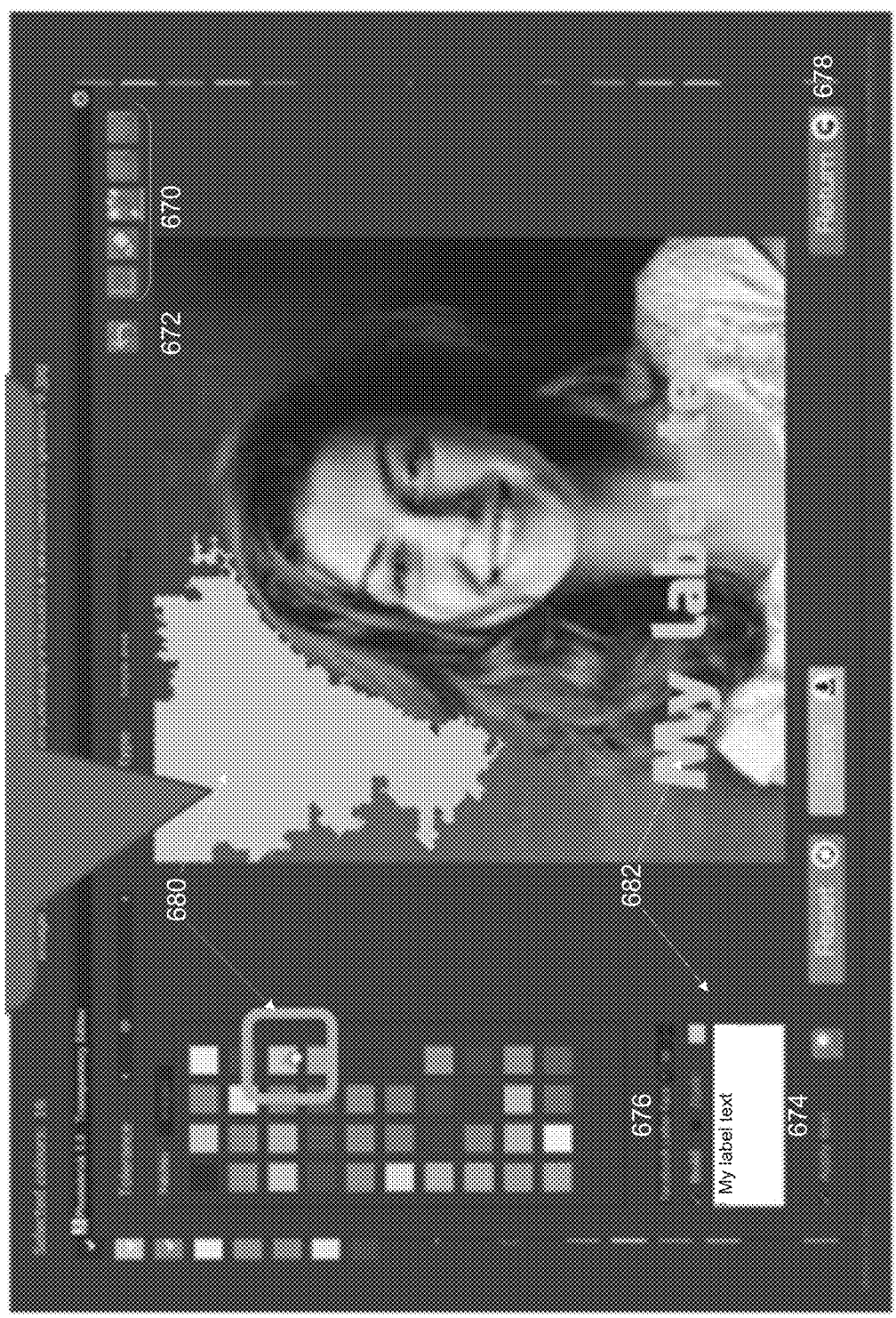

Reference is now made to FIG. 6A, FIG. 6B, which are screen shots of an exemplary GUI configured to enable a user to design a multi-image brick mosaic depicting each of a plurality of images from a different view angle, according to some embodiments of the present invention.

A screen shot (capture) 600 is an exemplary main screen (page, tab, etc.) of an exemplary GUI of a brick mosaic editor such as the brick mosaic editor 220. As seen, the GUI provides a user friendly interface comprising easily accessible User Interface (UI) elements, for example, tools, action icons, selection items, symbols, bars and/or the like to enable a user such as the user 204 to efficiently and effectively design a multi-image brick mosaic such as the multi-image brick mosaic 300.

For example, the GUI may include a working area 610 for displaying to the user 204 one or more selected images. Moreover, the GUI may include a path field 612 may present a path(s) of the displayed image(s) in a file system storing the displayed image(s). Typically, one image may be displayed in the working area 610. However, the user 204 may swap between selected files and/or select one or more images using an image selection symbol 630 provided by the GUI.

The GUI may include one or more tools, selectors and/or action symbols for defining and/or selecting the layout, size, shape and/or arrangement of the multi-image brick mosaic 300. For example, the user 204 may select the number of baseplates such as the baseplate 302 for the multi-image brick mosaic 300, an arrangement of the baseplates 302, a size of the baseplate 302 (amount of bricks 304 per baseplate) and/or the like using one or more of the tools provided by the GUI, for example, a baseplate selection and organization tool 614, bricks per baseplate selection tool 616 and/or the like. While selecting the layout of the multi-image brick mosaic 300 and/or arrangement of the baseplates 302, a size field 617 may present the actual (real world) size of the multi-image brick mosaic 300 computed based on the selected layout and arrangement.

The GUI may further include a display of a color palette 620 selected for bricks such as the bricks 304 used to build the multi-image brick mosaic 300 and optionally a color number selection bar 622 for selecting the number of selected colors included in the color palette 620.

The GUI may provide a rendering tool 632 for converting the selected image displayed in the working area 610 to a pixelated image as described in steps 104 and 106 of the process 100. A view selector 638 may be used by the user 204 to control the content displayed in the working area 610, specifically to swap between the original image and the pixelated image.

The GUI may provide one or more tools for manipulating, transforming and/or editing one or more of the selected image and/or their respective pixelated images. For example, the GUI may include an effects tool 626 to manipulate the selected image, for example, zoom in to select a region of intersect in the image, pan the image along one or more axes, shift the image and/or the like. In another example, the GUI may provide a dithering tool 624 to enable dithering of the image displayed in the working area 610 and/or part thereof. In another example, the GUI may include an edit tool 636 to enter an edit mode an edit one or more of the color attributes of one or more of the pixels of the pixelated image displayed in the working area 610.

The GUI may further include a reset tool 628 for discarding all changes made to the image and/or the pixelated image displayed in the working area 610 and restore the original image/pixelated image.

A finish tool 640 provided by the GUI may enable saving the current work session and/or part thereof including, for example, the selected images, the respective pixelated images, the manipulation, editing and/or effects applied to the pixelated images, the layout and arrangement selected for the multi-image brick mosaic 300 and/or the like. A print tool 634 may be used to instruct generation of the kit instructions and/or the assembly instructions for preparing the kit and assembling the bricks 304 to build the multi-image brick mosaic 300 to depict the pixelated images as displayed in the working area 610 including the editing, manipulation and/or effects applied to them in case such operations were applied.

A preview tool 642 may be used to enter a simulation mode and initiate a simulation preview in which the designed multi-image brick mosaic 300 may be simulated.

An exit tool 650 may be used to exit the GUI and finish the current session. An admin tool 660 may be used to ender an administrator mode typically using authentication credentials. The administrator mode may provide and/or enable one or more additional features, capabilities, maintenance actions and/or the like which are accessible and/or configurable only by authorized users 204.

A screen shot (capture) 602 is an exemplary editing mode screen of the exemplary GUI of the brick mosaic editor 220. The editing mode may be entered, for example, by selecting the edit tool 636 in the main screen 600. In the editing mode, the GUI may provide one or more tool bars for adjusting one or more of the attributes, for example, brightness, contrast, color, saturation, HDR of one or more of the pixels in the pixelated image displayed in a working area such as the working area 610 available by the GUI in the editing mode.

Moreover, the GUI may provide an editing tool bar 670 comprising one or more editing tools, for example, a pencil, a brush, a fill and/or the like for adjusting one or more of the pixels in the pixelated image displayed in a working area such as the working area 610 provided in the editing mode. For example, using the fill tool, the user 204 may select a certain color in the color palette to fill a certain pixel 680 in the pixelated image. Moreover, the user 204 may select a plurality of pixels in the pixelated image, for example, background and adjust their color. A text tool 674 may be provided in the editing mode to enable insertion of text into the pixelated image, for example, as overlay, underlay, partially transparent and/or the like. For example, the user 204 may type a certain text 682 using the text tool 674 and select where to place the certain text 682 in the pixelated image. Moreover, the GUI may provide one or more text formatting tools 676 in which one or more attributes of the text and/or part thereof may be selected, for example, a font type, a font size, a foreground color, a background color, bold, italic, underlined and/or the like.

The GUI may further provide an undo action symbol 676 to enable reversing (undo) of one or more recent adjustment operations made to the pixelated image. The GUI may include a return bottom 678 for returning to the previous screen of the brick mosaic editor 220, for example, back to the main screen.

Figure 7:
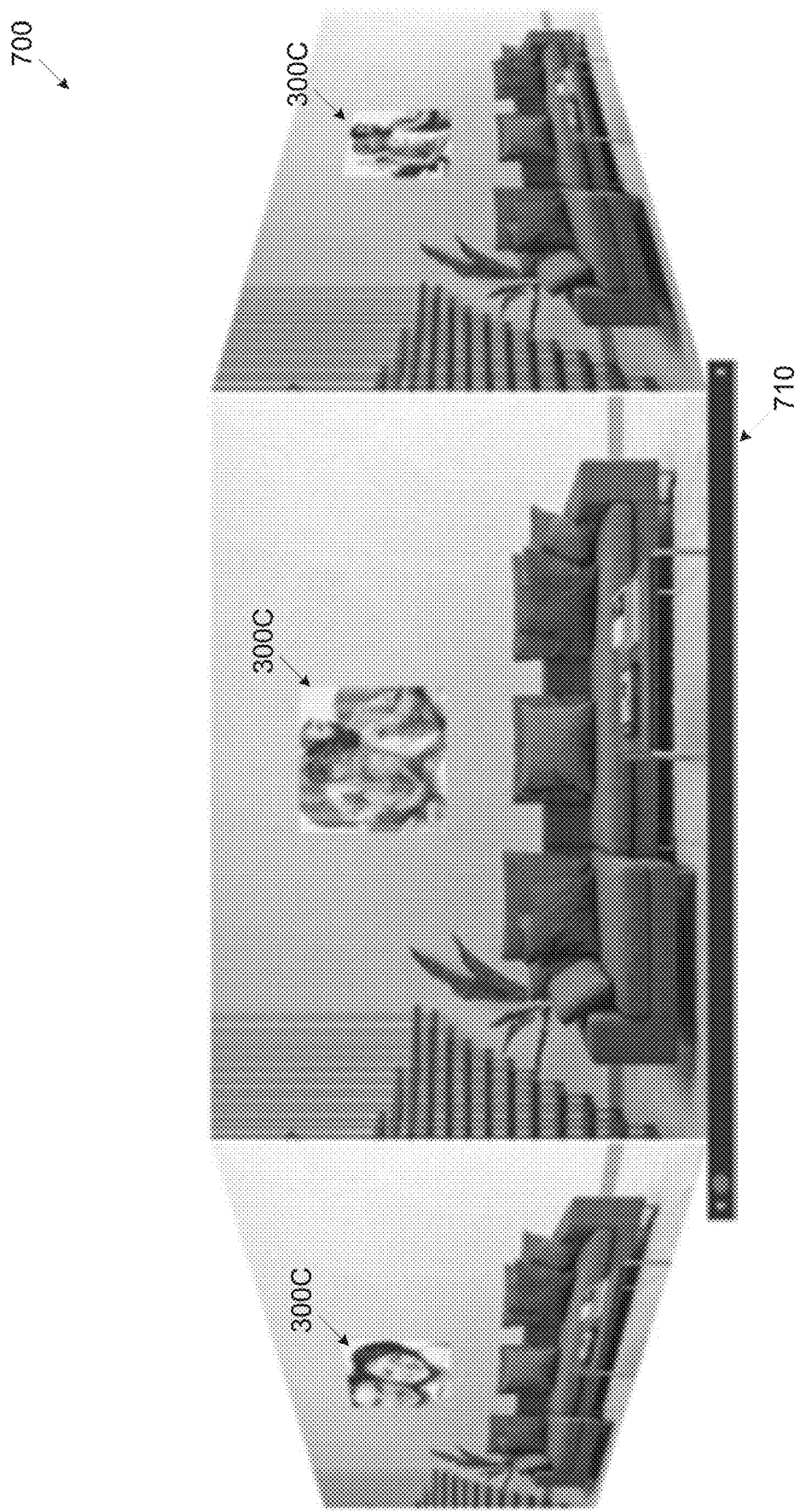
FIG. 7 is a screen shot of an exemplary GUI configured to enable a user to view a simulation of a multi-image brick mosaic depicting each of a plurality of images from a different view angle, according to some embodiments of the present invention.

Reference is also made to FIG. 7, which is a screen shot of an exemplary GUI configured to enable a user to view a simulation of a multi-image brick mosaic depicting each of a plurality of images from a different view angle, according to some embodiments of the present invention.

A screen shot (capture) 700 is an exemplary simulation preview mode screen (page, tab, etc.) of an exemplary GUI of a brick mosaic editor such as the brick mosaic editor 220. The simulation preview mode may be entered, for example, by selecting the preview tool 642 in a main screen of the brick mosaic editor 220, for example, the main screen 600. In the simulation preview mode, a preview of a multi-image brick mosaic such as the multi-image brick mosaic 300 designed using the brick mosaic editor 220 may be simulated and displayed to a user such as the user 204. While the screen shot 700 demonstrated simulation preview for a two image brick mosaic 300C such as the multi-image brick mosaic 300A, this should not be construed as limiting since the simulation preview may be adjusted and/or extended to simulate multi-image brick mosaic 300 designed and configured to depict more images. A navigation tool bar 710 may be provided to enable moving, rotating and/or shifting the viewing angle with respect to the simulated two image brick mosaic 300C such that when viewing the two image brick mosaic 300C from the first view angle, the first image may be formed while viewing the two image brick mosaic 300C from the second view angle, the second image may be formed.

Moreover, the GUI may provide one or more tool bars in the simulation preview mode to enable selectin of animation, for example, selection of the background of the simulated two image brick mosaic 300C which may be selected from one or more predefined background settings, for example, a living room, a bedroom, a kitchen, an office and/or the like. Optionally, the background may be selected from one or more images of real target environments selected by the user 204, for example, a real living room, a real kitchen and/or the like in which the user 204 may wish to simulate the two image brick mosaic 300C.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the term interlocking brick is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of computing instructions for building a multi-image brick mosaic depicting a plurality of images each from a different viewing angle, comprising:
using at least one processor for:
receiving a plurality of images each comprising a respective first number of pixels;
applying at least one image manipulation operation to at least one of the plurality of images, the at least one image manipulation operation is a member of a group consisting of: zooming, panning, rotating, shifting, and dithering;
converting each of the plurality of images to a respective one of a plurality of pixelated images comprising a predefined second number of pixels smaller than the first number;
selecting a color of each of the second number of pixels of each pixilated image from a limited number of colors;
computing kit instructions for preparing a kit comprising at least one baseplate and a plurality of brick sets each associated with a respective one of the plurality of images and comprising a plurality of interlocking bricks having a top facet aligned to a respective one of a plurality of angles, each of the plurality of bricks of each brick set is mapped to a respective pixel of the second number of pixels of a respective pixilated image and is painted in the color selected for the respective pixel;
computing assembly instructions for assembling each of the plurality of bricks of each of the plurality of brick sets on the at least one baseplate to build a multi-image brick mosaic depicting each pixelated image of each of the plurality of images when viewed from a respective angle;
outputting the kit instructions and the assembly instructions for building the multi-image brick mosaic using the kit.

2. The method of claim 1, wherein each of the second number of pixels of the respective pixelated image represents a respective group of adjacent pixels of the respective image.

3. The method of claim 2, wherein the color of the top facet of each of the second number of pixels of each pixilated image is selected from the limited number of colors based on a color analysis of the pixels of the respective group.

4. A method of computing instructions for building a multi-image brick mosaic depicting a plurality of images each from a different viewing angle, comprising:
using at least one processor for:
receiving a plurality of images each comprising a respective first number of pixels;
converting each of the plurality of images to a respective one of a plurality of pixelated images comprising a predefined second number of pixels smaller than the first number;
adjusting at least one color attribute of at least one of the second number of pixels of at least one of the plurality of pixelated images, the at least one color attribute is a member of a group consisting of: brightness, contrast, saturation and High Dynamic Range (HDR);
selecting a color of each of the second number of pixels of each pixilated image from a limited number of colors;
computing kit instructions for preparing a kit comprising at least one baseplate and a plurality of brick sets each associated with a respective one of the plurality of images and comprising a plurality of interlocking bricks having a top facet aligned to a respective one of a plurality of angles, each of the plurality of bricks of each brick set is mapped to a respective pixel of the second number of pixels of a respective pixilated image and is painted in the color selected for the respective pixel;
computing assembly instructions for assembling each of the plurality of bricks of each of the plurality of brick sets on the at least one baseplate to build a multi-image brick mosaic depicting each pixelated image of each of the plurality of images when viewed from a respective angle; and outputting the kit instructions and the assembly instructions for building the multi-image brick mosaic using the kit.

5. The method of claim 4, further comprising adjusting the color of at least one of the second number of pixels of at least one of the plurality of pixelated images.

6. The method of claim 5, wherein the color of the at least one of the second number of pixels of the at least one pixelated image is adjusted to include at least one symbol in the at least one pixelated image.

7. The method of claim 4, further comprising generating a simulated preview of the multi-image brick mosaic based on the kit instructions and the assembly instructions.

8. A method of computing instructions for building a multi-image brick mosaic depicting a plurality of images each from a different viewing angle, comprising:

using at least one processor for:

receiving a plurality of images each comprising a respective first number of pixels;

converting each of the plurality of images to a respective one of a plurality of pixelated images comprising a predefined second number of pixels smaller than the first number;

selecting a color of each of the second number of pixels of each pixelated image from a limited number of colors;

adjusting the color of at least one of the second number of pixels of at least one of the plurality of pixelated images;

computing kit instructions for preparing a kit comprising at least one baseplate and a plurality of brick sets each associated with a respective one of the plurality of images and comprising a plurality of interlocking bricks having a top facet aligned to a respective one of a plurality of angles, each of the plurality of bricks of each brick set is mapped to a respective pixel of the second number of pixels of a respective pixilated image and is painted in the color selected for the respective pixel;

computing assembly instructions for assembling each of the plurality of bricks of each of the plurality of brick sets on the at least one baseplate to build a multi-image brick mosaic depicting each pixelated image of each of the plurality of images when viewed from a respective angle; and outputting the kit instructions and the assembly instructions for building the multi-image brick mosaic using the kit;

wherein the color of the at least one of the second number of pixels of the at least one pixelated image is adjusted to alter at least partially a background of the at least one pixelated image.

9. A method of computing instructions for building a multi-image brick mosaic depicting a plurality of images each from a different viewing angle, comprising:

using at least one processor for:

receiving a plurality of images each comprising a respective first number of pixels;

converting each of the plurality of images to a respective one of a plurality of pixelated images comprising a predefined second number of pixels smaller than the first number;

selecting a color of each of the second number of pixels of each pixilated image from a limited number of colors;

computing kit instructions for preparing a kit comprising at least one baseplate and a plurality of brick sets each associated with a respective one of the plurality of images and comprising a plurality of interlocking bricks having a top facet aligned to a respective one of a plurality of angles, each of the plurality of bricks of each brick set is mapped to a respective pixel of the second number of pixels of a respective pixilated image and is painted in the color selected for the respective pixel;

computing assembly instructions for assembling each of the plurality of bricks of each of the plurality of brick sets on the at least one baseplate to build a multi-image brick mosaic depicting each pixelated image of each of the plurality of images when viewed from a respective angle;

outputting the kit instructions and the assembly instructions for building the multi-image brick mosaic using the kit; and generating a simulated preview of the multi-image brick mosaic based on the kit instructions and the assembly instructions; and changing a viewing angle of the simulated multi-image brick mosaic in the preview.

10. A method of computing instructions for building a multi-image brick mosaic depicting a plurality of images each from a different viewing angle, comprising:

using at least one processor for:

receiving a plurality of images each comprising a respective first number of pixels;

converting each of the plurality of images to a respective one of a plurality of pixelated images comprising a predefined second number of pixels smaller than the first number;

selecting a color of each of the second number of pixels of each pixilated image from a limited number of colors;

computing kit instructions for preparing a kit comprising at least one baseplate and a plurality of brick sets each associated with a respective one of the plurality of images and comprising a plurality of interlocking bricks having a top facet aligned to a respective one of a plurality of angles, each of the plurality of bricks of each brick set is mapped to a respective pixel of the second number of pixels of a respective pixilated image and is painted in the color selected for the respective pixel;

computing assembly instructions for assembling each of the plurality of bricks of each of the plurality of brick sets on the at least one baseplate to build a multi-image brick mosaic depicting each pixelated image of each of the plurality of images when viewed from a respective angle;

outputting the kit instructions and the assembly instructions for building the multi-image brick mosaic using the kit; and generating a simulated preview of the multi-image brick mosaic based on the kit instructions and the assembly instructions; and animating the preview to display the simulated multi-image brick mosaic over at least one predefined background.

11. A system for computing instructions for building a multi-image brick mosaic depicting a plurality of images each from a different viewing angle, comprising:
a tangible storage medium storing a code; and
at least one processor coupled to the tangible storage medium, the at least one processor is configured to execute the code, the code comprising:
code instructions to receive a plurality of images each comprising a respective first number of pixels,
code instructions to convert each of the plurality of images to a respective one of a plurality of pixelated images comprising a predefined second number of pixels smaller than the first number,
code instructions to adjust at least one color attribute of at least one of the second number of pixels of at least one of the plurality of pixelated images, the at least one color attribute is a member of a group consisting of: brightness, contrast, saturation and High Dynamic Range (HDR),
code instructions to select a color of each of the second number of pixels of each pixelated image from a limited number of colors,
code instructions to compute kit instructions for preparing a kit comprising at least one baseplate and a plurality of brick sets each associated with a respective one of the plurality of images and comprising a plurality of interlocking bricks having a top facet aligned to a respective one of a plurality of angles, each of the plurality of bricks of each brick set is mapped to a respective pixel of the second number of pixels of each pixilated image and is painted in the color selected for the respective pixel,
code instructions to compute assembly instructions for assembling each of the plurality of bricks of each of the plurality of brick sets on the at least one baseplate to build the multi-image brick mosaic depicting each pixelated image of each of the plurality of images when viewed from a respective angle,
code instructions to output the kit instructions and the assembly instructions for building the multi-image brick mosaic using the kit.

* * * * *